United States Patent
Bosloy et al.

(10) Patent No.: US 6,714,544 B1
(45) Date of Patent: Mar. 30, 2004

(54) METHOD AND APPARATUS FOR PROXIED SIGNALLING OF AN END TO END CONNECTION ACROSS A CONNECTION ORIENTED NETWORK

(75) Inventors: Jonathan L. Bosloy, Kanata (CA); John C. Burns, Los Altos, CA (US); Mark Tooker, Orleans (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/349,084

(22) Filed: Jul. 8, 1999

(51) Int. Cl.⁷ .............................................. H04L 12/28
(52) U.S. Cl. ................................. 370/395.1; 370/395.5; 370/410
(58) Field of Search ................................. 370/230, 236, 370/328, 338, 392, 395, 395.1, 395.2, 398, 399, 401, 410, 395.5

(56) References Cited

U.S. PATENT DOCUMENTS

| | | | | |
|---|---|---|---|---|
| 5,999,514 A | * | 12/1999 | Kato ........................... | 370/231 |
| 6,118,782 A | * | 9/2000 | Dixon et al. ................. | 370/389 |
| 6,222,843 B1 | * | 4/2001 | Mauger ....................... | 370/397 |
| 6,343,083 B1 | * | 1/2002 | Mendelson et al. .......... | 370/392 |
| 6,418,126 B1 | * | 7/2002 | Gilmurray et al. ........ | 370/310.1 |
| 6,421,316 B1 | * | 7/2002 | Masuo ........................ | 370/216 |
| 6,421,321 B1 | * | 7/2002 | Sakagawa et al. ........ | 370/238.1 |

OTHER PUBLICATIONS

ATM Forum Technical Committee, "Private Network–Network Interface (PNNI) Specification Version 1.0", Document No. af–pnni–0055.000, Mar. 1996.

ATM Forum Technical Committee, "User–Network Interface (UNI) Signalling Specification, Version 4.0", Document No. af–sig–0061.000, Jul. 1996.

ATM Forum Technical Committee, "User–Network Interface (UNI) Signalling Specification Version 3.1", Document No. af–uni–0010.002, 1994.

ATM Forum Technical Committee, "Interim Inter–Switch Signalling Protocal (IISP) Specification Version 1.0", Document No. af–pnni–0026.000, Dec. 1994.

* cited by examiner

Primary Examiner—Wellington Chin
Assistant Examiner—William Schultz
(74) Attorney, Agent, or Firm—Marks & Clerk

(57) ABSTRACT

There is provided a method and apparatus for establishing a connection across a connection oriented network to enable communication between an originating network element and a destination network node. The originating network element is connected to source network node in the connection oriented network by a source communications channel which is addressable in the connection oriented network. The connection oriented network has a signalling infrastructure employing a network signalling protocol for establishing connections within the connection oriented network. A connection establishment request message is generated for requesting the establishment of the connection between the originating network element and the destination network node and includes information identifying the source and destination communications channels. A proxy connection establishment request message is sent from a network controlling element to the connection oriented network over a proxy signalling link provided therebetween. The proxy connection establishment request message is received at the connection oriented network and the channel identifying information is extracted from the proxy connection establishment request message. A network connection establishment request message according to the network signalling protocol is then generated and sent over the signalling infrastructure to establish a path between the source network node and the destination network node. The path is connected to the communications channel identified in the proxy connection establishment request message, thereby establishing the connection between the originating network element and the destination network node.

41 Claims, 5 Drawing Sheets

METHOD AND APPARATUS FOR PROXIED SIGNALLING OF AN END TO END CONNECTION ACROSS A CONNECTION ORIENTED NETWORK

FIELD OF THE INVENTION

The invention relates generally to signalling the establishment of connections in connection oriented networks, for instance through the use of a management entity such as a call processor. More particularly, the invention relates to methods and apparatus for signalling the establishment of connections across ATM networks over a proxy signalling interface, for instance a user network interface or the like.

BACKGROUND OF THE INVENTION

Signalling protocols are often deployed to establish or set up connections so as to form an end to end path for a call in a communications network. Signalling in connection oriented networks is the process of establishing, maintaining and releasing a connection through the exchange of connection establishment request, connection acknowledgement, and connection clearing messages between the network elements along a given message path. At times, however, the originating calling equipment does not have the necessary network capabilities to signal a call in a given network through which a call must be routed. For instance, an intermediate network may not directly support the signalling protocols of the preceding and succeeding networks. As a result, an off-board call processor or network management device may be utilized to interface with the signalling of the proceeding and succeeding networks and to control the elements of the intermediate network. To control the intermediate network, the call processor or network manager must be able to efficiently establish connections across the intermediate network.

Communications networks may have particular or unique signalling protocols for setting up connections for calls, which signalling protocols may be unavailable to a succeeding network through which call establishment is to be propagated. In a communications environment of shared network resources, it is not uncommon for communication service providers to buy or rent access to bandwidth on a third party network from a network provider and use the third party network for the transmission of customer traffic. For instance, the introduction of competition in certain jurisdictions of the telephone industry has led to the creation of new competitors which are typically smaller or less capitalized than the former telephone monopolies. As well, these new competitors may sometimes offer more specialized or more restricted services than do the former monopolies. Often the newcomers to the telephone industry may not own end to end networks for carrying customer traffic. These newcomers may instead provide local networks that can connect customers to a backbone infrastructure, which in turn provisions connections to other local networks connected to the backbone. Alternatively, communication service providers may provide end to end communication systems but may wish to employ different types of networks within their systems. For example, a service provider may wish to establish local telephone networks employing traditional telephone communication technologies with interconnections between such networks being provisioned on high speed ATM networks. In all such cases, the signalling protocols of the various networks found along the call path may be incompatible or not supported from one network to another.

It is known in the art for a network management entity to be utilized in order to provision a connection path on behalf of another node across a connection oriented network. This may be implemented for purposes of establishing connections for or on behalf of equipment or networks which do not possess such capabilities, as described above, or for other reasons known to those skilled in this art. For example, it may be thought advantageous from the perspective of technology upgrades to dedicate the function of connection establishment and management to a network management entity. Typically, the goal of the network management entity is to provide path connectivity between ports in the network. The ports in question may be of various types, such as ATM ports, Frame Relay ports, Circuit Emulation ports, xDSL ports (such as ADSL, VDSL, HDSL and the like), and any other port types supported in the network being controlled. When the network management entity seeks to establish a path between two ports, it will normally dictate the channel number on each endpoint port. For example, the channel on a given port is a VPI/VCI for an ATM virtual circuit, a VPI only for an ATM virtual path, a DS0 for a T1 circuit emulation path, and a stream and DLCI for a frame relay path, to name but some examples.

Thus, when a given network is used to provide the backbone infrastructure for another originating network, it may be necessary to supply proxied connection establishment functions for the originating network. Whether for portions of the end to end call path which traverse the intermediate network or for the rest of the end to end path, the call set up is often administered on behalf of the originating network. This is typically done through an off board device or network management entity that is connected to the intermediate network. The off board device may be part of the signalling network for the originating network. The term "off board" means that the device is not necessarily part of a switch or node in the intermediate network. By way of specific example, off board devices are at times required for establishing connections across ATM networks on behalf telephone networks because telephone networks have not always been capable of performing signalling over typical ATM networks. Thus, call establishment, maintenance and tear down must be provided by a separate device such as an off board call processor. A signalling protocol typically used in telephone networks is the SS7 protocol. Currently, the SS7 protocol is often not supplied within an ATM network switch. Thus, in the specific example given above, the off board device would convert the SS7 signalling instructions into call setup instructions which are understood in the ATM network. It will be appreciated that various methods for setting up calls in an ATM network from an off board device are known to exist.

The communications system 10 of FIG. 1 is a specific example of the use of an ATM network 12 as a backbone for an originating network such as a telephone network. The communications system 10 consists of first and second telephone networks 14, 16, the ATM network 12 and an SS7 signalling network 18. The SS7 signalling network 18 provides call connection control for the telephone networks 14,16. The SS7 signalling network 18 receives call setup requests from the telephone networks 14,16 and establishes connections for an end to end call path between the desired source and destination of the call by configuring the necessary switching in the nodes of the telephone networks 14,16. The establishment of connections in communications networks using the SS7 protocol is well known to those skilled in the art. As explained previously, there are situations where it is desired to make a connection across the ATM network 12 in order to establish an end to end path for a call, for example in the event that a caller at a first telephone 20 connected to the first telephone network 14 wants to make a call to a person at a second telephone 22 connected to the second telephone network 16, and where the ATM network may not directly support SS7 signalling. If so, another method is therefore necessary to establish such connections in the ATM network. Typically in these situations, an off board device such as a call processor or network management entity 24 is used to establish the connection across the ATM network 12 required to set up the call.

In some instances, the time that is required to set up proxied connections to define an end to end path for a call can affect network performance. The longer the time that is required to set up a call, the fewer calls that a network may set up every minute. In situations where hundreds or thousands of calls are required to be set up every second, the efficiency of the method used in setting up calls is important. If call set up rates are too low, customers may give up trying to make a call rather than wait for an impractical period of time.

As explained in greater detail below, various categories of proxied methods for setting up a connection across a communications network, for instance an ATM backbone network, are currently known. According to a first category, a call processor may be implemented for this purpose, whereby the call processor utilizes a management protocol for establishing connections through a network. Ideally the call processor understands the full topology of the network in question, such as the nodes in the network, the links interconnecting the nodes, and the current utilization of links in the network. Given the endpoints of the required path through a network, the call processor computes the path it desires through the network. Once the decision is made, the call processor sends a command or series of commands to each node involved in the call path to direct it to create a cross-connect between the ingress port and the egress port of such nodes. Each node is given a separate management command or series of management commands to create the relevant cross-connect. Taken together, the resulting series of cross-connects and internode links form a complete path across the network connecting a channel from an ingress point in the network to an egress point thereof. To delete the path, the call processor sends one or more management commands to each node involved in the previously established path to request that the cross-connect on each node be removed.

The management commands mentioned above are typically implemented using standard management protocols such as Simple Network Management Protocol ("SNMP") or Common Management Information Protocol ("CMIP"), or may otherwise be executed via a proprietary management protocol implemented by the call processor and the nodes. A call processor will require a communication path for management commands for each node that it communicates with. For example, there could be a separate physical connection between the call processor and each node. Alternatively, the network may provide a method of routing management commands to nodes within itself, so that only a physical interface to one node is needed and then the commands can be routed internally in the network between the nodes using the links which connect the nodes.

The prior art according to the first category of proxied methods discussed above has been applied to various types of connection oriented networks. For instance, these teachings have been applied or are adaptable to a Frame Relay network, a narrow band circuit-switched network or other such networks. In the ATM network as shown in FIG. 1, a management protocol may be used to establish connections in the ATM network 12 by converting the originating signalling instructions into a set of management commands that are understood by the ATM network 12. In the specific example of an originating network which uses the SS7 signalling protocol, this conversion is done by the call processor 24 which acts as an interface between the SS7 network 18 and the ATM network 12. The call processor 24 receives the SS7 instructions from the SS7 network over an SS7 link 26 and uses the information in the SS7 signalling instructions to determine the cross-connects that are required to be made within various nodes of ATM network 12 in order to establish the end to end path for the call. The call processor 24 then sends a management command containing a cross-connect instruction to each node in the ATM network through which the call is to be routed. The management instructions are typically provided using the SNMP protocol, but alternatively may be provided by other management protocols such as CMIP. The connections established in this way by such management commands are called Permanent Virtual Connections (PVC). Typically PVC connections are used for connections that are required to be maintained for a relatively long period of time, i.e. days, months or even years.

The call set up procedure for establishing an end to end path for a call between the first telephone 20 and the second telephone 22 according to this first known category of methods for call establishment across a network will now be explained in more detail using the specific example of FIG. 1. First, the SS7 signalling network 18 will establish the necessary connections in the first telephone network 14 to connect the first telephone 20 to a bridge node 28 in the telephone network 14 which is connected to the ATM network 12. The SS7 signalling network 18 then provides SS7 instructions to the call processor 24 over the SS7 link 26. The information in the SS7 instructions would typically indicate that a connection should be made between the first bridge node 28 and a destination address, which the call processor 24 determines is currently best reached through a link (such as link 29) which connects to node 30 in network 16. Using this information in the SS7 instructions, the call processor 24 then issues SNMP management commands to those nodes in the ATM network 12 that will constitute the intermediate portion of the end to end call path. Thus, commands are sent to an ingress ATM node 34, a first intermediate ATM node 36 and an egress ATM node 38 to establish cross-connects within these nodes that will serially connect the first bridge node 28 to the second bridge node 30. Alternate paths may be established, for example, a second intermediate ATM node 40 could be used instead of the first intermediate ATM node 36. The SNMP management commands may be sent to the nodes in the ATM network 12 over management interfaces (not shown) between the call processor 24 and the nodes. These management interfaces may be provided over direct connections or may be routed through one or more nodes in the ATM network 12.

The establishment of a connection according to methods of the foregoing variety between the first and second bridge nodes 28, 30 requires several management commands to be sent to the various nodes in the ATM network 12. It will be appreciated that in situations where the connection is required to pass through more than only the three nodes of the example in FIG. 1, more management commands than described will be required to define the various cross-connects at each network node. Because the SNMP protocol was designed to set up PVCs that were intended to exist for long periods of time, the setup time associated with establishing cross-connects using SNMP is not usually a critical factor. As a result, the SNMP protocol tends to be unsuitable for applications where many temporary connections are required to be set up and cleared on an ongoing basis. Typically this method of using SNMP commands to establish PVCs is capable of routing only a few calls per second. It will be appreciated that these rates of call set up are unacceptable or disadvantageous for applications requiring fast call set up rates such as making backbone connections for high volume networks which may require call set up rates in the vicinity of hundreds of calls or more per second. Thus the management commands used for creation of cross-connections are cumbersome and are not optimized for a very high rate of cross-connection establishment or deletion.

Another disadvantage of this known first category of methods is that the call processor 24 must be provided with all the information about the topology of the ATM network 12 and needs to have the necessary computational capabilities in order to calculate the appropriate or optimal path through the ATM network 12 for the connection. This added complexity contributes to the relative slowness of this method and may give the call processor 24 more information about the ATM network 12 than is desirable for either the operator of the ATM network 12 or the operator of the telephone network, for instance, where these networks may be owned or operated by different persons.

According to a second category of known proxied methods for setting up connections in communication networks, signalling and routing intelligence is used within the network to establish paths from a source port and channel to a destination port and channel upon command from a call processor or network management entity. One example of these prior art methods is the Soft Permanent Virtual Circuit (S-PVC) feature of the PNNI protocol of the ATM Forum ("Private Network-Network Interface (PNNI) Specification Version 1.0", Document No. af-pnni-0055.0000, dated March 1996 and produced by the ATM Forum Technical Committee; hereafter "the PNNI Specification"). In this second category of prior art methods, the network management entity does not typically compute routes in the network and communicate with every node along the prospective path. Instead, it selects one of the endpoints as the source of an S-PVC, and sends a management command over a management link to the source node communicating the details of the source endpoint (such as slot, port, VPI, VCI for an ATM source endpoint, for instance). As well, the management entity will provide the source node with the destination address of the destination port, along with the desired destination VPI and VCI (for a destination ATM endpoint, for instance). The management command sent to the node to request the creation of an S-PVC may be done via a standard protocol such as SNMP or CMIP, or via a proprietary protocol. Usually, the source node will launch an SVC call, using well known techniques, from the source node to the destination node. In the case of the PNNI protocol, known to those skilled in this art, the source node computes the path through the network and includes it in the signalling message to steer the call through the network. This is known as source routing. In other signalling technologies that could be employed in the network, the call may be routed in a hop-by-hop manner from the source node to the destination node.

Included in a typical signalling message is the Called Party number, which allows the call to be routed to the destination node, and which informs the destination node of the interface to terminate the call on. A signalling Information Element ("IE") known as the "Called Party Soft PVPC or PVCC" in the case of the PNNI protocol, tells the destination node which channel to use on the destination interface. In the initial version of the PNNI protocol, this IE only allowed for the encoding of a VPI and a VCI value, which is suitable for cell relay (e.g. ATM) interfaces. Other interface types were handled by logically mapping their channel identifier into the VPI and VCI values available in the IE. For example, for Frame Relay interfaces, the DLCI could be carried in the VCI field. The PNNI standard is expected to be updated to allow other types of channel identifiers, such as DLCI for Frame Relay, to be carried in this IE in a standardized manner.

Not only does the network route and signal the call to the destination node according to the prior art methods of the second category, but in the case of an S-PVC connection the destination node will also automatically respond to the received call with a connect indication, which is signalled back to the originating node using the signalling infrastructure of the network. When the originating node receives the connect indication, it can notify the management entity over the management link that the path has been successfully created across the network. To provide for security, the network management entity may optionally also choose to send a command to the destination node for the S-PVC as well as to the source node which will send the call. In this way, when the S-PVC Call SETUP message reaches the destination node, the destination node may determine where the call originated in order to decide on whether it should accept the call and respond with a connect message, or whether the call is not expected and it should therefore reject the call and respond with a release message. However, this increases the amount of management commands that are required to set up or delete the S-PVC. To delete the path across the network according to the prior art methods of the second category, the network management entity sends a command over the management link to the source node to tell it to delete the S-PVC (and to the destination node over a separate management link if a command was previously sent to the destination node as well). The source node will release the call across the network by sending a release signalling message over the network signalling infrastructure. This will clear the call and its corresponding cross-connects across the network.

The second category of known methods for setting up connections will now be described with reference to the specific example of FIG. 1. In the ATM network 12, management commands are used to set up an S-PVC between the first bridge node 28 and second bridge node 30. Where the management commands follow the SNMP protocol, the S-PVC set up command contains information identifying the address of the ingress ATM node 34 in the ATM portion of the end to end call path (termed the "Calling Party") and the address of the egress ATM node 38 in the ATM portion of the connection (termed the "Called Party"). For instance, the SNMP S-PVC SETUP command may contain information identifying the virtual path identifier (VPI) and virtual connection identifier (VCI) for each of the channels connecting the first bridge node 28 and the second bridge node 30 to the first intermediate ATM node 34 and second intermediate ATM node 38, respectively. These VPI/VCI values are termed the "Calling Party Soft PVPC or PVCC" and "Called Party Soft PVPC or PVCC" respectively. When the S-PVC setup command is received by a node in the ATM network 12, for example the ingress ATM node 34, the node uses signalling to establish the S-PVC between the endpoint channels. The nodes in the ATM network 12 are typically connected by a network-node interface (NNI) or other network signalling link. The network node interface is typically provisioned over a Permanent Virtual Channel.

Referring again to FIG. 1, the ingress ATM node 34 receives the SNMP S-PVC set up command from the call processor 24 and generates the S-PVC SETUP request message in accordance with the signalling protocol employed, based on the information received in the SNMP command. The S-PVC SETUP request message is then forwarded through the ATM network 12 in accordance with its particular signalling protocol and a connection path is established in the ATM network connecting the specified channel on ATM node 34 to the specified channel on ATM node 38, thus forming a connection between the first bridge node 28 and second bridge node 30. The use of signalling protocols to establish S-PVCs in ATM networks is known to those skilled in the art.

Compared to prior art methods of the first category, the prior art methods of the second category allow for less management commands to create or delete a path, especially as the number of the nodes through which the path will traverse increases. Also, the burden of computing the path across the network is removed from the network management entity and is charged to the network nodes. Although fewer management commands are required with these methods than with methods of the first type described above, the relative slowness of executing SNMP commands remains a problem for applications where the establishment of many calls per second is desired. Typically this second method allows for a call setup rate in the vicinity of tens of calls per second. Thus, prior art methods according to this second category may provide for higher performance, but the management commands used are still typically cumbersome and not designed for a very high rate of path creation and deletion.

According to a third category of prior art methods, the proxy signalling capabilities provided in the ATM Forum UNI protocol, namely Annex 2 of "User-Network Interface (UNI) Signalling Specification, Version 4.0", Document No. af-sig-0061.000, dated July 1996 (the "UNI 4.0 Specification") are utilized. An earlier version of this protocol was released in 1994 as "User-Network Interface (UNI) Signalling Specification Version 3.1", Document No. af-uni-0010.002 produced by the ATM Forum Technical Committee (the "UNI 3.1 Specification"). Such known proxy signalling allows a management entity or call processor to provide a Switched Virtual Connection ("SVC") signalling control for interfaces which do not have their own direct signalling. For example, a proxy signalling interface can control an ingress interface of an originating node in an intermediate network found along the end-to-end call path, as well as many other interfaces on the originating node. Likewise, another proxy signalling interface can control an egress interface with many other interfaces on the terminating node. This use of known proxy signalling is specific to the case where a network management entity is employed to control a network and set up and tear down connection paths, as in the prior art methods of the first category discussed above. An advantage of known proxy signalling methods of this third category is that the call processor 24 does not need to know all of the details about the ATM network 12 in order to establish a connection across the ATM network 12.

Where a network management interface according to the third category of known methods is used to connect a given channel and port for an originating node to a given channel and port for a terminating node, as in the previous prior art examples, the network management interface will be configured to control the exact channel number at both ends of the path. Since the selection of a channel number at each path endpoint is dictated by the network management interface, this decision is not made by the endpoint nodes. This behaviour of the network management interface is not a requirement of generalized proxy signalling, as described in the UNI 4.0 Specification, at Annex 2 thereof Since the proxy signalling link can control one or many physical ports, the signalling messages must be able to indicate which port is being controlled, along with the VPI and VCI for the connection. In ATM Forum signalling like the UNI 4.0 or PNNI protocols, this is done by signalling a VPCI value and a VCI value. The VPCI value is mapped to a port and a VPI. An example of this mapping is shown in the UNI 4.0 Specification, Annex 2, Section A2.4 (at page 89 thereof). The VPCI and the VCI are indicated in the Connection Identifier IE.

At the originating proxy signalling link, which spans the originating node of the intermediate network and the network management interface, the network management interface will send a Call SETUP message to the originating node in order to initiate the path across the network being traversed. The network management interface will dictate the specific channel number on a given endpoint port for the connection. In the UNI 4.0 Specification, a network management interface can dictate this channel number by including the Connection Identifier IE in the SETUP message sent over the proxy signalling link. The Connection Identifier will have a VPCI value, which the switch will map to a pre-defined port and a pre-defined VPI on that port. The Connection Identifier will also have a VCI value to be used on the port and VPI. Thus, the originating endpoint is fully defined by the network management interface. If UNI 3.1 signalling or IISP signalling is being used instead, then the particular node in question may be configured as the user-side of the protocol, and the network management interface may be configured as the network side of the protocol. This is required since in the UNI 3.1 or IISP protocols, only the network side of the protocol is allowed to include the Connection Identifier IE in a SETUP message. The IISP protocol is defined in "Interim Inter-Switch Signalling Protocol (IISP) Specification Version 1.0", Document No. af-pnni-0026.000, dated December 1994 and produced by the ATM Forum Technical Committee, and is well known to those in this art (the "IISP Specification"). The UNI 3.1 or IISP signalling protocols normally do not allow a VPCI to represent multiple ports, but as long as the network management interface and the switch agree on the mapping, the VPCI value can be used as per the UNI 4.0 specification.

Typically, the SETUP message sent over the proxy signalling link will also have the Called Party number of the destination. The Called Party number could represent a specific port on the destination switch, or it could represent a logical port or a group of ports. Upon receipt of the Call SETUP message over the proxy signalling link, the originating node of the intermediate network over which the connection is being established will signal the call across the network in the usual manner. At the destination node of the intermediate network, the Called Party number IE in the Call SETUP message will indicate a specific port or a group of ports. In either of these cases, the signalling link for the port or ports indicated will be a distinct return proxy signalling link which connects back to the same network management interface that is controlling the network. Thus, each of the originating and terminating nodes of the network being traversed will be connected to the network management interface via respective signalling links.

In the foregoing example, the network management interface will also dictate the exact destination channel as it did at the originating end. With UNI 4.0 signalling on the proxy signalling link, this can be accomplished by configuring the terminating node to act as a non-assigning side for calls sent over the signalling link to the network management interface. Then, when the Call SETUP message is sent by the terminating node to the network management interface, it will not include the Connection Identifier IE, and the terminating node will make no decision on what the destination endpoint should be. For UNI 3.1 or IISP signalling on the particular network node can again run the user side of the protocol, and the network management interface will run the network side of the protocol. In this way, the node will act as the non-assigning side and will not include the Connection Identifier IE in the SETUP message sent over the terminating proxy signalling link to the network management interface.

Upon receiving the Call SETUP message from the terminating node over the terminating signalling link, the network management interface can then proceed to select the channel that it wishes for the destination of the path being set up, and signal a CONNECT message back over the terminating signalling link to the terminating network node to indicate that the call is accepted. The CONNECT message contains the Connection Identifier IE indicating the VPCI and the VCI of the endpoint to use. The destination node will complete the connection with the selected channel (again, the VPCI maps to port and VPI, and the VCI is also provided for a VC-level path). The CONNECT indication is signalled back across the network over its signalling infrastructure and to the network management interface via the originating proxy signalling link which connects it to the originating network node. At this point, the network management interface knows that the path is connected end-to-end successfully.

To remove the established connection path, the network management interface sends a RELEASE message for the call over either of the respective proxy signalling links associated with the originating and terminating network nodes. The RELEASE message will next be signalled across the network and the cross-connects will be removed. The RELEASE message will propagate to the opposite proxy signalling link back to the network management interface (e.g. if sent out by the network management interface over the proxy signalling link associated with the originating node, it will be received over the proxy signalling link associated with the terminating node and vice versa).

In order to establish an end to end path for calls with proxy signalling according to the third category of known methods, the call processor 24 of FIG. 1 is connected to the ATM network 12 by a network interface signalling link (not shown) and may, for instance, send Call SETUP request messages on behalf of an external node connected to the ATM network 12 such as the first bridge node 28. Often a network node of an adjacent network may be connected to an ATM backbone network but cannot perform signalling on its own behalf For example, the signalling must be performed on behalf of the first bridge node 28 by the call processor 24 because the first bridge node 28 is not connected to the ATM network by a signalling link. Thus, in these or other proxy signalling arrangements, the call processor 24 uses the UNI signalling link channel to establish an SVC in the ATM network 12. The SVC SETUP request message contains a Called Party Information Element for identifying the destination ATM node for the SVC. However, the SVC SETUP may only be used to establish a connection to an ATM endpoint identifiable by a Called Party address. In the communications system 10 of FIG. 1, signalling links are not provided between telephone networks 14, 16 and the ATM network 12. Thus, ATM node 38 would be the called party for an SVC providing a portion of the end to end call path between the telephone 20 and telephone 22. Similarly, the ATM node 34 would be the calling party for such a SVC. UNI signalling may be used to establish an SVC between the ATM node 34 and the ATM node 38.

In methods according to the third category of known techniques, signalling is used instead of management protocols such as SNMP or CMIP to establish and remove paths across a connection oriented network. Such signalling protocols and the call processing logic used to handle calls are normally optimized for very high call establishment and tear down rates, and so these prior art techniques can potentially provide a very efficient and high speed method of establishing and removing paths in a connection oriented network. One issue with these prior art methods is that the network management interface has to somehow correlate the call which it launched over one proxy signalling link with a call which is later received over the same or a different proxy signalling link. A single proxy signalling link could result where the source and destination interfaces are on the same node. Moreover, the network management interface may be launching many such calls at the same time. Thus, some sort of scheme must be used to correlate a call sent to the network with a call received from the network where it is desired to use the prior art techniques of the third category.

One available method of correlation is to use an IE which is carried end-to-end across the network, such that it will be in the originated SETUP message and in the received SETUP message. In such an IE, the network management interface could encode some sort of identifier such that it can match up a SETUP sent with a SETUP received. For each path to be established, the network management interface has to send a Call SETUP message, then receive a Call SETUP message, then send a CONNECT message, and then receive a CONNECT message. In this way, proxy signalling work is done at both ends of the network. Moreover, other messages like CALL PROCEEDING or CONNECT ACK may also be involved at each end of the network according to the prior art techniques of the third category, as known to those skilled in this art. When the path is removed, a RELEASE is sent at one end of the network and a RELEASE is received at the other end of the network. Again, there are other messages like RELEASE COMPLETE as well which may be involved in signalling a connection. So, while the signalling interface can provide a much more efficient interface into the node and provide for much higher call setup and tear down rates, with the third category of prior art techniques the network management interface has to correlate the sent and received calls, and thus deal with the overhead of signalling at both ends of the network.

Based on the foregoing, it can be seen that there is a need for another method of establishing proxied connections across a connection oriented network, for instance where compatible signalling is not provided between an ingress or egress node in a connection oriented network and an adjacent network or network device. It would therefore be advantageous to provide a method and corresponding apparatus for proxied signalling that would seek to reduce the amount of signalling work undertaken by a call processor 24, to avoid signalling traffic to and from both the source and the destination network nodes, to avoid the necessity of having to correlate a call setup sent with a call setup received, and to be capable of fully specifying both the source and the destination endpoints over the originating proxy signalling interface. This is especially desirable if ATM backbone networks are to be used to provide connections for telephony networks or any other communications networks featuring high call volumes. And while it is often necessary to allow users of connection oriented networks to have some degree of control over call setup in connection oriented networks, at the same time it is desirable to reduce the complexity required of the user for establishing the connections in such networks. It is an object of the present invention to attempt to meet these varied needs with a proxied signalling method and apparatus which permits connection establishment across a connection oriented network, such as an ATM network, whether or not signalling is provided along the entirety of the end-to-end call path, as explained in greater detail below.

SUMMARY OF THE INVENTION

According to a first broad aspect of the present invention, there is provided a method for establishing a connection across a connection oriented network on behalf of an originating network element to enable communications between the originating network element and a destination network node, the destination network node being addressable in the connection oriented network, the originating network element being connected to a source network node in the connection oriented network by a source communications channel addressable in the connection oriented network, the connection oriented network having a signalling infrastructure employing a network signalling protocol for establishing connections within the connection oriented network, the method comprising the steps of: (a) generating a proxy connection establishment request message for requesting the establishment of the connection between the originating network element and the destination network node, the proxy connection establishment request message comprising information identifying the source communications channel; (b) sending the generated proxy connection establishment request message from a network controlling element to the connection oriented network over a proxy signalling link provided between the network controlling element and the signalling infrastructure of the connection oriented network; (c) receiving the proxy connection establishment request message at the connection oriented network over the signalling link; (d) extracting the information identifying the source communications channel from the proxy connection establishment request message so received and establishing a cross-connect at the source network node to the source communications channel identified in the proxy connection establishment request message; (e) generating a network connection establishment request message according to the network signalling protocol; (f) sending the generated network connection establishment message over the signalling infrastructure to establish a path between the source network node and the destination network node using automated signalling procedures according to the network signalling protocol; (g) sending a network acknowledgement message which confirms establishment of said path, said network acknowledgement message being sent according to the network signalling protocol from the destination network node to the source network node over said signalling infrastructure; (h) after said path is established, sending a proxy acknowledgement message which confirms establishment of said connection between the originating network entity and the destination node, said proxy acknowledgement message being sent to the network controlling element from the source network node.

According to a second broad aspect of the present invention, there is provided a network controlling element for signalling a connection across a connection oriented network on behalf of an originating network element to enable communications between the originating network element and a destination network node, the destination network node being addressable in the connection oriented network, the originating network element being connected to a source network node in the connection oriented network by a source communications channel addressable in the connection oriented network, the connection oriented network having a signalling infrastructure employing a network signalling protocol for establishing connections within the connection oriented network, a proxy signalling link being provided between the network controlling element and the signalling infrastructure of the connection oriented network, the network controlling element comprising: (a) a communications interface for receiving instructions for establishing the connection on behalf of the originating network element; (b) a proxy signalling interface for generating a proxy connection establishment request message, for transmitting the proxy connection establishment request message over the proxy signalling link to the signalling infrastructure of the connection oriented network, and for receiving a proxy connection acknowledgement message from the source network node which is indicative of the establishment of the connection; and wherein the proxy connection establishment request message comprises information identifying the source communications channel, the information identifying the source communications channel being extracted from the proxy connection establishment request message when same is received at the connection oriented network over the proxy signalling link, wherein a cross-connect is established at the source network node to the source communications channel identified in the proxy connection establishment request message and wherein a network connection establishment request message is generated according to the network signalling protocol and is sent over the signalling infrastructure to establish a path between the source network node and the destination network node using automated signalling procedures according to the network signalling protocol, whereupon the proxy connection acknowledgement message is sent to the network controlling element from the source network node.

According to a third broad aspect of the present invention, there is provided an apparatus associated with a source network node for establishing a connection across a connection oriented network between an originating network element and a destination network node via the source network node, the source network node and the destination network node being addressable in the connection oriented network, the originating network element being connected to the source network node by a source communications channel addressable in the connection oriented network, the connection oriented network having a signalling infrastructure employing a network signalling protocol for establishing connections within the connection oriented network, the source communications channel being identified in information included in a proxy signalling message consisting of a proxy connection establishment request message received by the apparatus over a proxy signalling link, the apparatus comprising: (a) a proxy signalling interface which sends and receives proxy signalling messages over the proxy signalling link; (b) a network signalling interface which sends and receives network signalling messages over the signalling infrastructure of the connection oriented network; (c) a call controller which extracts from the proxy connection establishment request message the information identifying the source communications channel, which establishes a cross-connect at the source network node to the source communications channel identified in the proxy connection establishment request message and which generates a network signalling message consisting of a network connection establishment request message according to the network signalling protocol, the call controller providing the network connection establishment request message to the network signalling interface which in turn sends the network connection establishment request message over the signalling infrastructure of the connection oriented network to thereby establish a path between the source network node and the destination network node; and wherein after the path between the source network node and the destination network node has been so established, the apparatus receives a network signalling message consisting of a network connection acknowledgement message from the destination network node over the signalling infrastructure and at the network signalling interface, following which the call controller provides a proxy signalling message consisting of a proxy connection acknowledgement message to the proxy signalling interface.

BRIEF DESCRIPTION OF THE DRAWINGS

By way of illustration and not of limitation, various embodiments of the present invention will next be described, in which.

DETAILED DESCRIPTION OF THE PREFERRED EMBODIMENTS

While the present invention will be described below in relation to an embodiment thereof based on ATM networking and with reference to certain signalling procedures, those skilled in this art will appreciate that the invention may be adapted to establish connections in other networking models and using other signalling procedures. For instance, the present invention may be adaptable to networking protocols such as Frame Relay, Narrowband Integrated Services Digital Network (NISDN), Broadband ISDN User Part (BISUP), ATM Interworking Network Interface (AINI) and ITU Standard Q.2931. Likewise, the routing employed in the network could be source routing as in the PNNI protocol or in hop-by-hop routing. And while the present invention will be described by reference to a single ATM network containing a limited number of nodes therein, it will be understood by those skilled in the art that the invention may be adapted to more complex network topologies featuring a larger number of network nodes and network interconnections.

Figure 1:
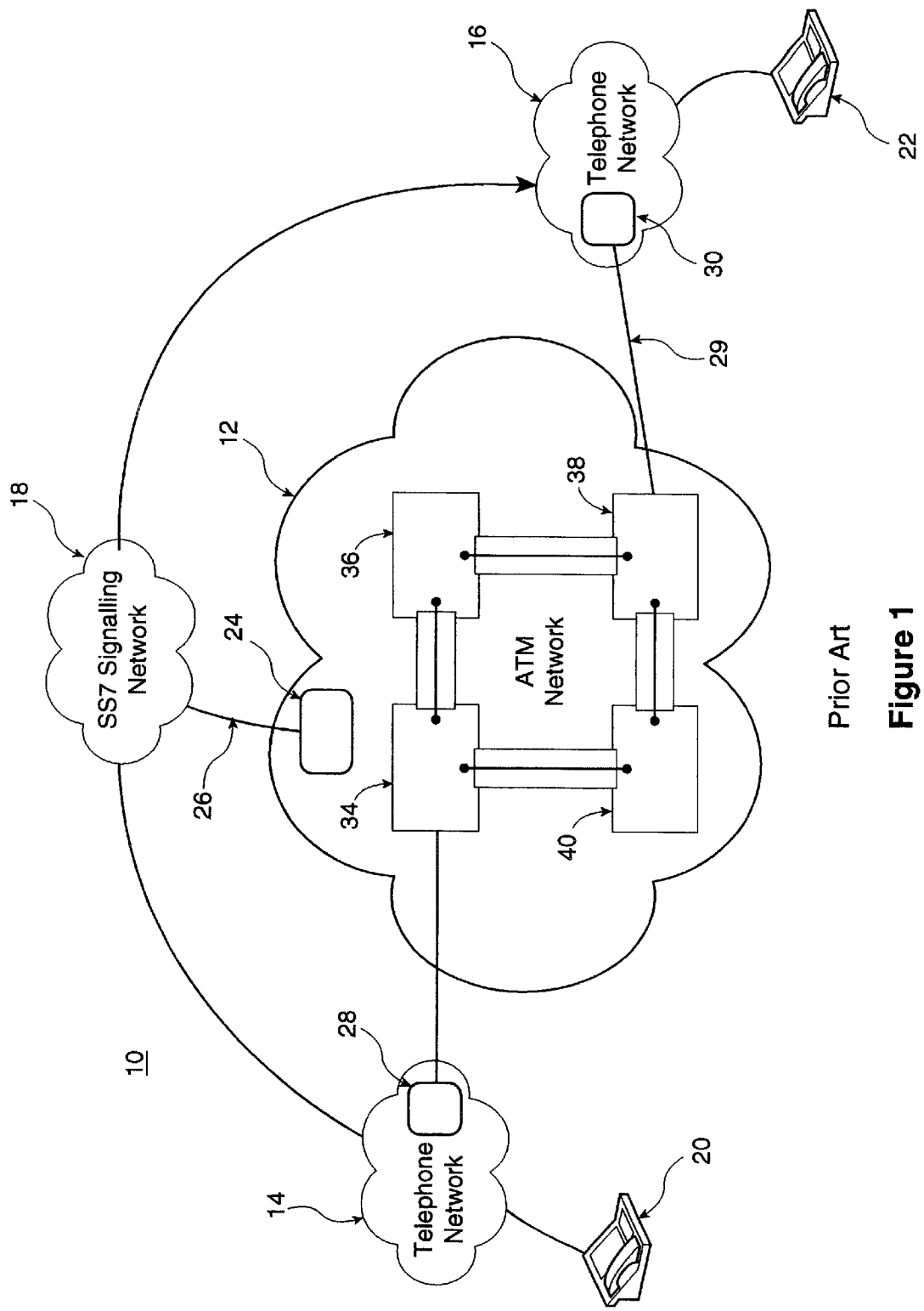
FIG. 1 is a schematic representation of a communications system of the prior art.
Figure 2:
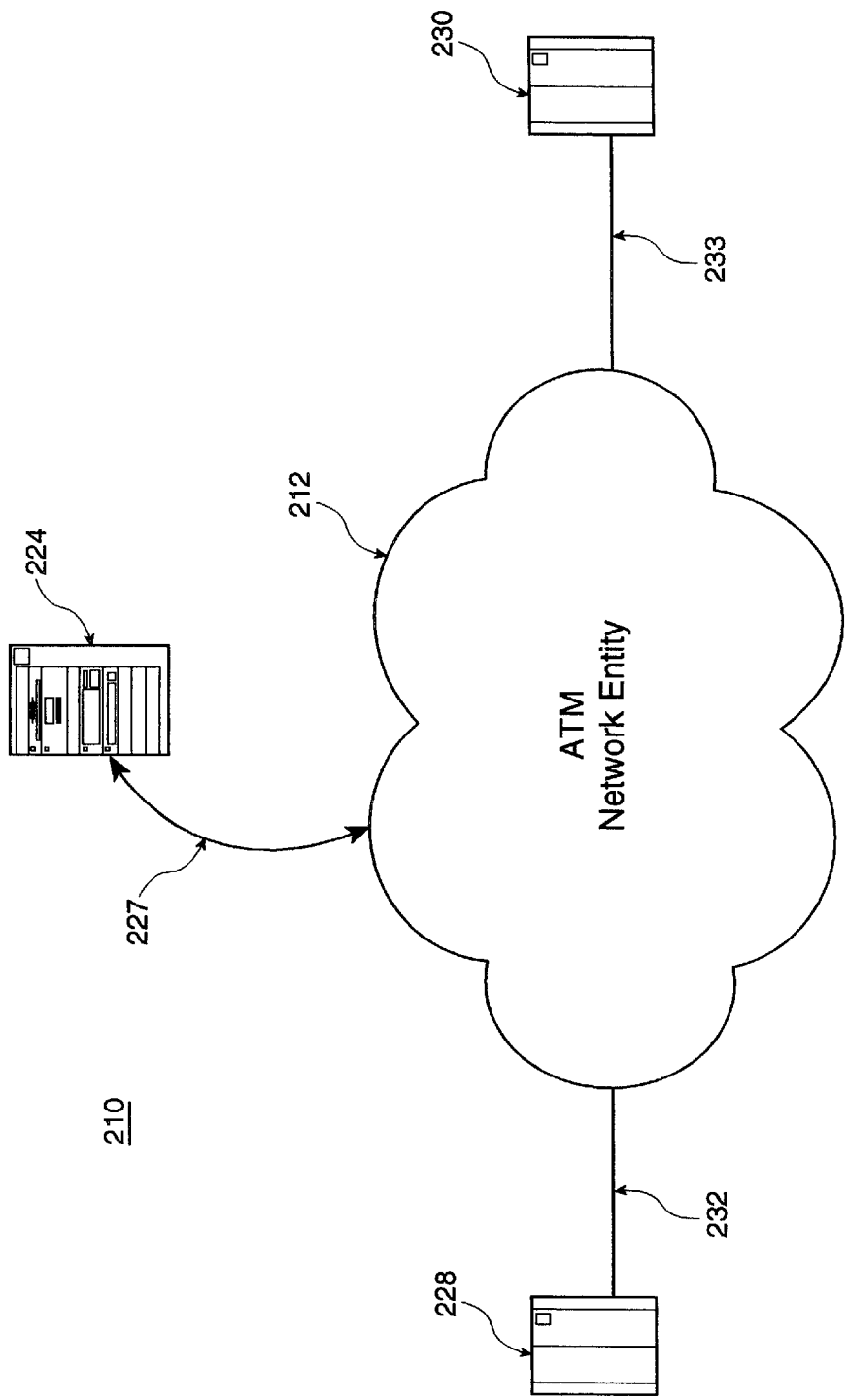
FIG. 2 is a schematic representation of a second communications system showing a call processor and ATM network and a signalling link provided therebetween according to a first embodiment of the present invention.

An exemplary communications system 210 in which an embodiment of the invention may be implemented is shown in FIG. 2. The communications system 210 includes an ATM network entity 212 and a call processor 224 which is connected to the ATM network entity 212 by a signalling link 227. By network entity is meant a network space comprising one or a plurality of network elements. In FIG. 2, the ATM network entity 212 may be a single ATM bridge, switch or router or may be a network of such devices, or even a network of networks. In the specific example of FIG. 2, two network elements which are external to the network entity 212, namely first and second service switching points 228, 230, are also connected to the ATM network entity 212. While service switching points 228, 230 have been depicted as equipment, these network elements may generally be understood to be network nodes external of the network entity 212. For instance, the service switching points 228, 230 may be nodes pertaining respectively to preceding and succeeding networks (not shown).

The method of the current invention has particular application where no signalling links are provided between the service switching points 228, 230 and the ATM network entity 212. That is, neither the first service switching point 228 or the second service switching point 230 is capable of using signalling protocols to establish connections across the ATM network entity 212. The call processor 224 is therefore use d to establish a connection across the ATM network entity 212 between the first and second service switching points 228, 230 using the signalling protocol associated with the ATM network entity 212. It will be appreciated that although the method of the invention is advantageous where it is desired to connect network elements for which signalling links are not provided, the method of the invention is not limited to this application.

Connections are established between an originating network element and a terminating network element in the form of the service switching points 228, 230. These connections are provisioned across the ATM network entity 212 by supplying information about the endpoint channels provided between the service switching points 228, 230 and the ATM network entity 212. The endpoint channels are provided on source and destination communications interfaces 232, 233. The communications interfaces 232, 233 may each provide one or many channels of communication between the service switching points 228, 230 and the ATM network entity 212. Information identifying the endpoint channels that are to be used to establish the connection across the ATM network entity 212 is included in a proxy connection establishment request message which is sent over the proxy signalling link 227 by the call processor 224 to the ATM network entity 212. Signalling link 227 is described in more detail below. The ATM network entity 212 is configured to recognize the information identifying the endpoint channels included in the proxy connection establishment request message. The ATM network entity 212 then establishes the connection between the identified endpoint channels as explained more fully below.

Where each of the endpoint channels identified in the proxy connection establishment request message are connected to a single node within the ATM network entity 212, or where the ATM network entity 212 consists of a single node or switch, a cross-connect connecting the identified endpoint channels is established within that single node. Where the ATM network entity 212 includes a plurality of nodes connected successively between the endpoint channels identified in the proxy connection establishment request message, the ATM network entity 212 may use signalling to establish a connection between the two nodes in the ATM network entity 212 which are connected to the endpoint channels. Signalling is also used to establish the necessary cross-connects at those two nodes in order to connect the endpoint channels to the connection established between the nodes and each service switching point, thus completing the point to point connection. The ATM network entity 212 may establish the connection between the endpoint channels by sending one or more network connection establishment request messages according to a NNI procedure where the network connection establishment request message contains information identifying the endpoint channels. For instance, connection establishment request messages according to the signalling procedures specified in the PNNI specification may be used to establish the point to point connection.

Figure 3:
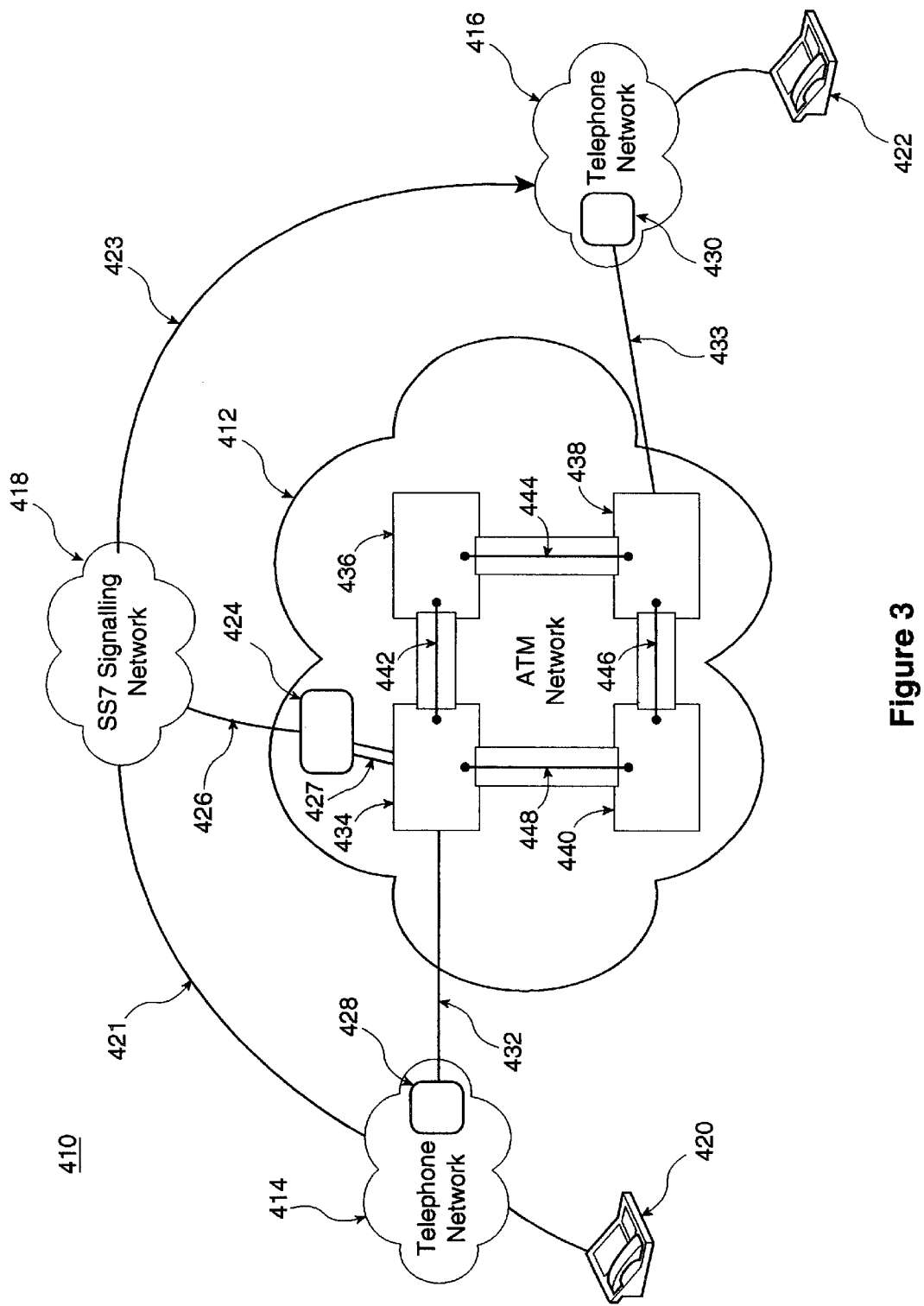
FIG. 3 is a schematic representation of a communications system in which the connections are established across an ATM network according to the first embodiment of the present invention.

The method of the invention may be introduced in more detail by reference to another communications system 410 shown in FIG. 3. The communications system 410 comprises a plurality of network entities including an ATM network 412. The ATM network 412 serves as an intermediate linking network between a source telephone network 414 and a destination telephone network 416 which provide conventional telephone communications services to subscribers. The present invention is described herein by reference to the communications system 410 in which the ATM network 412 provides connections between two telephone networks 414, 416 by way of example only, and it will be appreciated that the present invention is applicable to the establishment of connections across ATM networks for other applications. For example, the ATM network 412 may provide backbone service to TCP/IP networks carrying data traffic, Frame Relay networks or other ATM networks.

Signalling in the telephone networks 414, 416 is typically performed by an SS7 signalling network 418 which uses the SS7 signalling protocol to establish and clear calls in the telephone networks 414, 416. The SS7 signalling network 418 may also perform signalling functions for other telephone networks not shown in FIG. 3. It will also be appreciated that the SS7 signalling function may be performed by more than one SS7 signalling network. The SS7 signalling protocol is a popular standard signalling protocol for telephone networks. However, it will be appreciated that other signalling protocols may be used and that other types of networks may have their own signalling protocols. The SS7 signalling network 418 may establish connections in the telephone networks 414, 416 to connect terminal equipment such as the source and destination telephones 420, 422 to other terminal equipment in the telephone networks 414, 416. For this purpose, source and destination SS7 signalling links 421, 423 are provisioned between the SS7 signalling network 418 and the source and destination telephone networks 414, 416. The establishment of calls using SS7 signalling is known to those skilled in the art of telephone communications.

In the event that a subscriber at a terminal in the source telephone network 414 desires to make a call to a terminal in the destination telephone network 416, the call must be routed through the ATM network 412. It will be appreciated, however, that the ATM network 412 may not directly implement SS7 signalling internally. Therefore, an off board call processor 424 is provided to establish connections in the ATM network 412 on behalf of the SS7 signalling network 418. The call processor 424 is provided with SS7 signalling information over a third SS7 signalling link 426. The call processor 424 may be a personal computer or other computing device running software that recognizes SS7 signalling commands such as the TeleHub Virtual Access Services Platform™ (VASP™) manufactured by TeleHub Technologies Corporation ("TTC") of Gurnee, Ill., U.S.A. The call processor 424 is part of the ATM network 412 and is connected to other nodes in the ATM network 412 by one or more user network interfaces such as signalling link 427. The call processor 424 may also be connected to other nodes by other proxy signalling links not shown in FIG. 3. In the preferred embodiment of the invention, the signalling link 427 is a UNI based link provided over an OC3 cell relay interface which may support multiple signalling links. As explained more fully below, the signalling link 427 is a modified user network interface according to an embodiment of the invention. Those skilled in the art will appreciate that other interfaces may be used for the signalling link 427.

The call processor 424 may also be connected to a particular node in the ATM network 412 via more than one signalling link. In this manner, redundancy of signalling links between the call processor and the particular node may be provided. In the event that a signalling link between the call processor 424 and a node goes down (and does not recover within a prescribed period determined according to the applicable signalling protocol), all calls controlled by that signalling link are cleared. Where redundancy is provided, the calls may be re-established over one or more of the additional signalling links.

The signalling link between the call processor 424 and a node in the ATM network may be direct or indirect. A direct connection, like the modified UNI signalling link 427, is provided where there are no intermediate nodes between the call processor 424 and the node at the other end of the signalling link. An indirect link is provided where a signalling link passes through one or more intermediate nodes between the call processor 424 and the node at the other end of the signalling link. It will be appreciated by those skilled in the art that the method of the invention has similar application where direct or indirect signalling links are provided. According to one embodiment of this invention, the signalling link 427 is a modified signalling link based on enhancements to UNI Signalling, whether UNI 3.1, UNI 4.0, or ITU-T Q.2931 signalling. The nature of these enhancements is described in detail below.

The source and destination telephone networks 414, 416 are connected to the ATM network 412 by connections between an originating network element 428 and a terminating network element 430 respectively. These elements 428, 430 act as bridge nodes between the telephone networks 414, 416 and the ATM network 412. The nodes 428, 430 are connected respectively to the ATM network 412 by source and destination communications interfaces 432, 433. The communications interfaces 432, 433 may be any kind of communications interface appropriate for connecting to an ATM network as will be appreciated by those skilled in the art. In the preferred embodiment of the invention, the communications interfaces 432, 433 are each comprised of several communication link circuit emulation. While the terms "originating" and "terminating", or "source" and "destination", are used throughout this specification, those skilled in this art will understand that these expressions are merely nominal, in that reference to a particular network node as being a "source" or a "destination" is dependent on the direction of propagation for a connection which is being established. In the case of interfaces 432, 433, if a connection were being established in a direction opposite to that previously described, the communications interfaces 432, 433 would respectively constitute a "destination" and a "source" interface with reference to that particular connection. Likewise, this is the case for the directional terms "originating" and "terminating".

The ATM network 412 may comprise a plurality of network elements, however, for simplicity, four ATM nodes 434, 436, 438, 440 are shown in FIG. 3 with signalling links 442, 444, 446, 448 provisioned therebetween. The ATM nodes 434, 436, 438, 440 may be ATM switches such as the MainStreet Xpress (TM) 36170 network switch from Newbridge Networks Corporation of Kanata, Ontario, Canada. Other ATM switches known to those skilled in the art may alternatively be used. The ingress ATM node 434 is provided with the functionality required to implement the methods of the invention. Again, the expression "ingress" is nominal since it has been chosen with regard to a direction of propagation for a connection being established from network element 428 to network element 430. Any one or more of the other ATM nodes 436, 438, 440 may also be provided with this functionality in order to perform the methods of the invention. However, if the call processor 424 only provides proxy connection establishment request messages to the ingress ATM node 434, then the other ATM nodes 436, 438, 440 do not require this functionality. The signalling links 442, 444, 446, 448 are provided in accordance with a network signalling protocol such as that described in the PNNI specification, previously mentioned. The source communications interface 432 may be connected to a port on a particular shelf or slot in the source ATM node 434. The destination communications interface 433 may be connected to a port on a particular shelf or slot in the destination ATM node 438. Where T1 interfaces are utilized, each channel connected to an ATM node may be identified by the node's ATM address, and a virtual path identifier and virtual channel identifier (VPI/VCI) value. As previously mentioned, any other type of interface may be connected to the ATM node, for instance E1 circuit emulation, T1 circuit emulation, and DS3 to name some examples. Typically, the called party plus the VPI/VCI value will identify the shelf, slot, port and channel in the ATM node.

It will be appreciated that the method of the invention may be used to establish either virtual channel connections or virtual path connections across an ATM network. Where the method is used to establish only a virtual path connection, the endpoint channels may be identified merely by a virtual path identifier (VPI). However, where the method is used to establish a virtual channel connection, the endpoint channels will be identified by a VPI and a virtual channel identifier VCI. For the remainder of this specification reference will only be made to the use of VPI/VCI values, but it will be understood by those skilled in the art that only VPI values will be required where the connection to be established is a VPC. For instance, as the PNNI specification is expanded to include explicit support for other types of endpoints (e.g. Frame Relay), then the method of identifying endpoint channels will likewise accommodate the new types of endpoints, e.g. a DLCI value. While this is not yet supported by the NM signalling protocols, other endpoint channel types (e.g. Circuit Evaluation and Frame Relay) can be mapped into VPI/VCI values.

In one implementation of an embodiment of the invention, the call processor 424 signals the setup of S-PVC connections across the ATM network 412 by sending proxy signalling messages over the signalling link 427. An S-PVC is a connection between network entities which is established by signalling and may include connections to end points for which signalling links may not be provided. The method by which the S-PVC is set up will be explained by reference to an example in which a call is desired to be established between the source telephone 420 and the destination telephone 422.

Telephone 420 initiates a call to telephone 422. The first telephone network 414 routes the call towards the destination 422. Signalling among the switches in the network 414 use signalling techniques such as found in SS7 signalling. The telephone network 414 will next choose to route the call over link 432, and for instance selects a channel thereon. The network 414 sends an SS7 ISUP message "IAM" over the SS7 signalling network to the call processor 424. The call processor 424 selects an egress channel which leads towards the intended destination of the call, which in this case is on link 433. Call processor 424 sets up the call between the ingress and egress channels of the ATM network 412 as described later. When the connection over the intermediate network is confirmed, the call processor 424 then sends an SS7 "IAM" message to the switch connected to link 433 (the egress link in this example) via the SS7 signalling network. The telephone network 416 then continues to route the call onward to the destination 422 in the manner previously described.

As the call processor 424 is responsible for establishing connections between the telephone networks 414, 416 and points in the ATM network 412, it will store information which identifies how the nodes 428, 430 are connected to the ATM network 412. This information will typically include the ATM addresses of the source and destination ATM nodes 434, 438 which are connected to the source and destination telephone networks 414, 416 and identifications of the channels on the communications interfaces 432, 433 connecting the ATM nodes 434, 438 to the bridging nodes 428, 430. The call processor 424 also stores the port and VPI/VCI values associated with each channel on the communication interfaces 432, 433. This information would typically be stored in tables in a memory device on the call processor 424 such as a ROM or RAM chip or a disk drive, or may be accessed by the call processor externally by way of a remote memory device.

Upon receiving an instruction from the SS7 signalling network 418 to establish a connection between a channel on communication link 432 and the destination of the call, the call processor 424 searches the tables in its memory to determine the ATM addresses of the nodes in the ATM network 412 that will become the endpoints for the ATM portion of the connection within the call. Thus, the call processor consults the rules in its routing tables and determines that the particular destination can be reached via communications link 433, and then it selects an available channel on this link. In order to distinguish it from the whole of the connection, the ATM portion of the connection may be referred to herein as the "intermediate path". These endpoints of the intermediate path are referred to as the calling party and the called party, and are not to be confused with the terminal endpoints of the call, whether these endpoints are considered to be the source and destination telephones 420, 422 or the nodes 428, 430. Thus, the call processor 424 is able to determine that for a connection between the originating link 432 and the terminating link 433, the calling party is the ingress ATM node 434 and the called party is the egress ATM node 438. The call processor 424 also searches tables in its memory to determine the port and VPI/VCI values for the channel on the communications interface 432, identified by the SS7 signalling network 418 and for the channel it selected on communication interface 433.

The call processor 424 runs software which implements an interface which allows the call processor 424 to construct proxy signalling messages. The interface constructs a proxy connection establishment request message based on the information provided by the SS7 signalling network 418 and the information derived from the memory tables of the call processor 424. The proxy connection establishment request message constructed by the interface specifies the ATM address of the called party and also the port and VPI/VCIs associated with the channels to be used for the connection, enabling the call processor 424 to signal the establishment of the connection across the ATM network 412 between the bridging nodes 428, 430. The proxy connection establishment request message preferably contains information for (i) identifying the channel on the source communications interface 432 for the endpoint connection between the source ATM node 434 and the originating bridging node 428, (ii) identifying the destination ATM node 438 and (iii) identifying the channel on the destination communications interface 433 for the endpoint connection between the destination ATM node 438 and the terminating bridging node 430. The proxy connection establishment request message may additionally contain other information about the point to point connection that is to be established including an identification of the ingress ATM node 434 (the calling party), a traffic descriptor, quality of service parameters, and other information that might be considered to be useful in a particular application.

The proxy connection establishment request message is provided to the source ATM node 434 over the signalling link 427. The source ATM node 434 is capable of recognizing signalling messages received over the signalling link 427 and processes the message in the following manner. When a proxy connection establishment request message is received, the source ATM node 434 constructs a network connection establishment request message for requesting the establishment of an S-PVC based on the information in the proxy connection establishment request message. The network connection establishment request message is in accordance with the signalling protocol used for the signalling links 442, 444, 446, 448. The preferred signalling procedure for the signalling links 442, 444, 446, 448 is the PNNI signalling procedure and the network connection establishment request message is preferably the PNNI SETUP message. When the proxy connection establishment request message is received by the source ATM node 434, a confirmatory message may be sent back to the call processor 424 over the signalling link 427 to indicate that connection establishment has been initiated. Where the protocol used on the signalling link 427 is based on UNI 3.1, UNI 4.0 or Q.2931 signalling, the acknowledgement message may be the CONNECT message as specified in the UNI 3.1, UNI 4.0 or Q.2931 specifications.

The route for the intermediate path in the ATM network 412 may be determined by a source routing procedure or, where the PNNI protocol is not used, alternatively by a hop-by-hop routing procedure. Source routing involves the selection of a route for a path at the calling party end of the setup request. In order to perform source routing, the calling party which performs the routing must be provided with information about the network, the component nodes, and possible routes therethrough. In hop-by hop routing, the route is determined by each intermediate network node along the call path independently selecting the succeeding leg or hop of the call path until the destination address of the call (the called party) is progressively attained. Where a signalling interface follows the PNNI specification for signalling procedures, source routing is used and the network connection establishment request message is provided with a designated transfer list (DTL) which contains a list identifying all of the nodes in the route in the ATM network. Source routing, hop-by-hop routing, the PNNI protocol and DTLs are known to those skilled in the art.

The network connection establishment request message includes the information identifying the destination ATM node 438 and the information identifying the channel of the destination communications interface 433 connecting the destination ATM node 438 to the terminating bridging node 430. The source ATM node 434 determines the subsequent node in the ATM network 412 to which the network connection establishment request message should be passed and establishes a cross-connect within the source ATM node 434 making a connection between the channel on the source communications interface 432 identified in the proxy connection establishment request message and the next leg of the path as determined by either the source routing or hop-by-hop routing procedures discussed above. Each node in the path similarly establishes cross-connects until the network connection establishment request message is received at the destination ATM node 438. The destination ATM node 438 establishes a cross-connect between the path and the channel on the destination communications interface 433 identified in the network connection establishment request message. The destination ATM node 438 then returns a network connection acknowledgement message back to the source ATM node 434 along the network connection established by the network connection establishment request message. The details of the network connection acknowledgement message are determined according to the signalling procedure used in the ATM network 412, and will be known to those skilled in the art. For example, the network connection acknowledgement message may be a CONNECT message according to the PNNI protocol. The source ATM node 434 then signals to the call processor 424 over proxy signalling link 427 that a path for the call across the ATM network 412 has been established. The call processor 424 is thereby informed that the selected channels on the source and destination communications interfaces are connected by means of a path established through the network.

In another embodiment of the invention, the selection of the channel to be used on the second communications interface 433 is deferred to the destination ATM node 438. In this embodiment, the proxy SETUP message and network SETUP message may indicate that any available channel at the called party may be used. After selecting a channel the called party returns information identifying the selected channel and port with the network CONNECT message. The selected channel is then identified to the SS7 signalling network 418 which then continues the connection at the bridge node 430 using SS7 signalling. Various methods of selecting the last segment of a connection in a connection oriented network are known to those skilled in the art. In this alternative embodiment of the invention, the selection of the endpoint channel at the called party may be deferred to the called party by indicating "any value" in the Selection Type octet of the Called Party Soft PVC Information Element, as reproduced below.

The preferred methods, protocols and signalling procedures for implementing the foregoing embodiments of the present invention will next be described. The procedure for signalling over the signalling link 427 may be based on the UNI 3.1 specification (referenced above) and features certain enhancements as will be described in detail below. Thus, the proxy connection establishment request message is based on the SETUP message of the UNI signalling protocol. The implementation of the method of the invention in the call processor 424 provides access to the UNI 3.1 signalling procedure through a standard signalling ATM Adaptation Layer such as AAL5. The method may be implemented in the software in the interface of the call processor 424 such as an application programming interface (API). An API allows an application such as the SS7 signalling network 418 to gain access to ATM-based capabilities. For example, the API of the call processor 424 may execute procedures which convert information provided by the SS7 signalling network 418 into ATM signalling messages which may be transmitted on the signalling link 427. In this method, the call processor 424 runs the network-side of the UNI 3.1 protocol. At the other end of the signalling link 427 the source ATM node 434 uses a signalling protocol which may be based on UNI 3.1 user-side, or if not available on the switch, based on IISP signalling user-side, which is a derivative of UNI 3.1 signalling and can inter-operate in this application. The IISP protocol is designed for use as a Network-Network or Network-Node Interface (NNI) protocol.

For signalling between the ATM nodes 434, 436, 438, 440 the PNNI signalling protocol is preferably used. It will be known to those skilled in the art that the use of PNNI signalling within the ATM network 412 provides for the establishment of S-PVCs. The advantage of using S-PVCs to establish connections in the ATM network 412 is the ability to establish a final cross-connect in an ingress or egress ATM node to the endpoint channel that connects that ATM node to a bridging node, such as node 430, whether or not a signalling link is provided between the ingress or egress ATM node and the relevant bridging node. In the preferred embodiment, the proxy SETUP message containing information identifying the endpoint channels is provided to the source ATM node 434 which extracts the information identifying the endpoint channels from the proxy SETUP message and generates a network SETUP message for requesting the establishment of an S-PVC according to the PNNI protocol.

The proxy SETUP message provides various Information Elements across the signalling link. The Information Elements contain information about the call request. Typically the Information Elements required for a signalling message such as a SETUP message are specified by the applicable signalling protocol. The proxy SETUP message of one embodiment of the present invention is based on the UNI 3.1 signalling protocol as outlined in the UNI 3.1 specification with certain modifications thereto. UNI 3.1 SETUP messages are based on the SETUP message defined in ITU-T Recommendation Q.2931, dated February, 1995 and published by the International Telecommunications Union, with modifications described in the UNI 3.1 specification.

The proxy SETUP message of one embodiment of the invention will now be described in detail with reference to the Table 1 below and accompanying footnotes. Each Information Element described in the first column of the table is to be understood according to the codeset 0 standardized ITU-T format. In the column labelled "Reference", the relevant section of ITU-T Recommendation Q.2931 is provided. In the column labelled "Type", it is indicated whether the inclusion of the particular information element is mandatory ("M") or optional ("O"). The last column of the table provides the length of the particular Information Element, or a permissible range of lengths, in octets. Not all of the footnotes listed in ITU-T Recommendation Q.2931 are reproduced below.

TABLE 1

Proxy SETUP Message Content

| Information Element | Reference | Type | Length |
| --- | --- | --- | --- |
| Protocol discriminator | 4.2 | M | 1 |
| Call reference | 4.3 | M | 4 |
| Message type | 4.4 | M | 2 |
| Message length | 4.4 | M | 2 |
| AAL parameters | 4.5 | $O^{(1)}$ | 4–21 |
| ATM traffic descriptor | 4.5 | M | 12–20 |
| Broadband bearer capability | 4.5 | M | 6–7 |
| Broadband high layer information | 4.5 | $O^{(2)}$ | 4–3 |
| Broadband repeat indicator | 4.5 | $O^{(3)}$ | 4–5 |
| Broadband low layer information | 4.5 | $O^{(4)}$ | 4–17 |
| Called party number | 4.5 | $O^{(5)}$ | 4- |
| Called party subaddress | 4.5 | $O^{(6)}$ | 4–25 |
| Calling party number | 4.5 | $O^{(7)}$ | 4- |
| Calling party subaddress | 4.5 | $O^{(8)}$ | 4–25 |
| Connection identifier | 4.5 | $O^{(9)}$ | 4–9 |
| End-to-end transit delay | 4.5 | $O^{(10)}$ | 4–10 |
| Notification indicator | 4.5 | $O^{(11)}$ | 4-* |
| OAM traffic descriptor | 4.5 | $O^{(12)}$ | 4–6 |
| QoS parameter | 4.5 | M | 6 |
| Broadband sending complete | 4.5 | $O^{(13)}$ | 4–5 |
| Transit network selection | 4.5.30 | $O^{(14)}$ | 4- |

Note 5—The called party number information element is included by the user to convey called party number information to the network. The called party number information element is included by the network when the called party number information is conveyed to the user.
Note 6—Included in the user-to-network direction when the calling user wants to indicate the called party sub-address. Included in the network-to-user direction if the calling user included a called party sub-address information element in the SETUP message.
Note 7—May be included by the calling user or the network to identify the calling user.
Note 8—Included in the user-to-network direction when the calling user wants to indicate the calling party sub-address. Included in the network-to-user direction if the calling user included a calling party sub-address information element in the SETUP message.
Note 9—Included in the user-to-network direction when a user wants to indicate a virtual channel. Included in the network-to-user direction when the network wants to indicate a virtual channel. If not included, its absence is interpreted as any virtual channel is acceptable. This information element may only be absent when using non-associate signalling procedure.

In order to implement embodiments of the present invention, the contents of a typical UNI 3.1 SETUP message are modified to include information that is required for the setup of an S-PVC in the ATM network 412. It will be appreciated from the above that no Information Element is provided in a typical UNI 3.1 SETUP message for providing to a network the information necessary for the network to establish an S-PVC. However, among the Information Elements in a typical UNI 3.1 call SETUP message are the Called Party Number and Connection Identifier Information Elements. In one embodiment of the invention the call processor 424 constructs a proxy SETUP message in which the Called Party Number and Connection Identifier information elements are modified to provide the information necessary for the source ATM node 434 to request the setup of an S-PVC in the ATM network 412 between the source communication link 432 and the destination communication link 433.

When the call processor 424 signals a proxy SETUP message to the source ATM node 434, the call processor 424 acts as the network side of the proxy signalling link 427, and thus is the assigning side. The Connection Identifier Information Element in the proxy SETUP message is used to encode a channel identification for indicating the channel to be used on the source communications interface 432. The channel identification for instance may include the VPI/VCI values of the channel on the source communications interface 432. The channel identification is contained within the Connection Identifier Information Element in a location that is recognized by the UNI 3.1 or IISP protocol at the network side of the proxy signalling link 427, that is, by the source ATM node 434. In one embodiment of the present invention, the Connection Identifier Information Element is comprised of nine octets and the channel VPI/VCI values are encoded in the octets six to nine. An example of a Connection Identifier information element according to the preferred embodiment of the invention is provided immediately below:

| 8 | 7 | 6 | 5 | 4 | 3 | 2 | 1 | Octet |
|---|---|---|---|---|---|---|---|---|
| 0 | 1 | 0 | 1 | 1 | 0 | 1 | 0 | 1 |
| Connection Identifier Information Element Identifier ||||||||  |
| 1 | 0 | 0 | 0 | 0 | 0 | 0 | 0 | 2 |
| ext | Coding Standard || Flag | Reserved | IE action indicator ||| |
| Length of Connection Idetifier IE |||||||| 3 |
| Length of Connection Idetifier IE (continued) |||||||| 4 |
| 1 | 0 | 0 | 0 | 0 | 0 | 0 | 0 | 5 |
| ext | spare || VP Associated signalling || Preferred/Exclusive ||| |
| VPI value |||||||| 6 |
| VPI value (continued) |||||||| 7 |
| VCI value |||||||| 8 |
| VCI value (continued) |||||||| 9 |

The Called Party Number Information Element in the proxy SETUP message is used to encode identifications of both the called party, i.e. the destination ATM node 438, and the channel to be used on the second communications interface 433. The channel identification for instance may include the VPI/VCI values of the channel. The ATM address of the called party is stored in the usual location beginning at the sixth octet. The VPI/VCI values are contained within the Called Party Number information element in a location that is recognized by the IISP protocol at the network side of the UNI signalling link 427, that is, by the ingress ATM node 434. In the preferred embodiment, the Called Party Number Information Element is comprised of 25 octets and the channel VPI/VCI values are encoded in octets twenty-two to twenty-five. An example of a Call Party Number information element according to a preferred embodiment of the invention is provided immediately below:

| 8 | 7 | 6 | 5 | 4 | 3 | 2 | 1 | Octet |
|---|---|---|---|---|---|---|---|---|
| 0 | 1 | 1 | 1 | 0 | 0 | 0 | 0 | 1 |
| Called Party Number Information Element Identifier ||||||||  |
| 1 | 0 | 0 | 0 | 0 | 0 | 0 | 0 | 2 |
| ext | Coding Standard || Flag | Reserved | IE action indicator ||| |
| Length of Called Party Number IE |||||||| 3 |
| Length of Called Party Number IE (continued) |||||||| 4 |
| 1 | 0 | 0 | 0 | 0 | 0 | 1 | 0 | 5 |
| | Type of number ||| Addressing/numbering plan identification |||| |
| ATM End system Address Internal Switch Subscriber Prefix of destination node |||||||| 6–18 |
| 00 |||||||| 19 |
| 80 |||||||| 20 |
| 21 |||||||| 21 |
| VPI value |||||||| 22 |
| VPI value (continued) |||||||| 23 |
| VCI value |||||||| 24 |
| VCI value (continued) |||||||| 25 |

The Connection Identifier IE provides 16 bits for a VPCI value and 16 bits for a VCI value. Thus, this gives 32 bits to fully specify the port and the channel on the port. This is sufficient for certain types of ports. For example, if the goal is to be able to specify Circuit Emulation ports, then the VPCI value can contain both the shelf and slot (encoded into 16 bits), and the port and DS0 channel number can be encoded together into the 16-bit VCI field. In this way, the Connection Identifier can identify any shelf, slot, port, and DS0 on the node for the source endpoint. Similarly, for Circuit Emulation ports, the Called Party number can be encoded such that the address prefix specifies the destination node, and the ESI portion of the address is used to encode the shelf/slot/port/DS0 of the destination endpoint. The foregoing embodiment of the invention provides a fixed number of bytes for the Connection Identifier and the Called Party Number IEs. This embodiment is useful for encoding Circuit Emulation ports, for instance. An alternative embodiment for specifying the endpoints for the connection is described below, following the discussion concerning the network SETUP message.

The known contents of the PNNI SETUP message are described in Table 2 and the accompanying footnotes which immediately follow. Each Information Element described in the first column of the table is to be understood according to the codeset 0 standardized ITU-T format. In the column labelled "Reference", the relevant section of the previously mentioned PNNI specification is provided. In the column labelled "Type", it is indicated whether the inclusion of the particular information element is mandatory ("M") or optional ("O"). The last column of the table provides the length of the particular Information Element, or a permissible range of lengths, in octets.

TABLE 2

Network SETUP message contents

| Information Element | Reference | Type | Length |
|---|---|---|---|
| Protocol discriminator | 6.4.2 | M | 1 |
| Call reference | 6.4.3 | M | 4 |
| Message type | 6.4.4.1 | M | 2 |
| Message length | 6.4.4.2 | M | 2 |
| AAL parameters | 6.4.5.8 | O$^{(1)}$ | 4–21 |
| ABR additional parameters | 6.4.5.5 | O$^{(1)}$ | 4–14 |
| ABR setup parameters | 6.4.5.6 | O$^{(11)}$ | 4–36 |
| Alternative ATM traffic descriptor | 6.4.5.7 | O$^{(12)}$ | 4–30 |
| ATM traffic descriptor | 6.4.5.9 | M | 12–30 |
| Broadband bearer capability | 6.4.5.10 | M | 6–7 |
| Broadband high layer information | 6.4.5.11 | O$^{(1)}$ | 4–13 |
| Broadband repeat indicator | 6.4.5.13 | O$^{(6)}$ | 4–5 |
| Broadband low layer information | 6.4.5.12 | O$^{(1)}$ | 4–17 |
| Called party number | 6.4.5.15 | M | (2) |
| Called party soft PVPC or PVCC | 6.4.6.2 | O$^{(4)}$ | 4–11 |
| Called party subaddress | 6.4.5.16 | O$^{(1)}$ | 4–25 |
| Calling party number | 6.4.5.17 | O$^{(1)}$ | 4–26 |
| Calling party soft PVPC or PVCC | 6.4.6.1 | O$^{(3)}$ | 4–10 |
| Calling party subaddress | 6.4.5.18 | O$^{(1)}$ | 4–25 |
| Connection identifier | 6.4.5.22 | O$^{(3)}$ | 4–9 |
| Connection scope selection | 6.4.5.23 | O$^{(1)}$ | 4–6 |
| Designated transit list (DTL) | 6.4.6.4 | M$^{(7)}$ | 33–546 |
| Endpoint reference | 6.4.8.1 | O$^{(1)}$ | 4–7 |
| End-to-end transit delay | 6.4.5.24 | O$^{(8)}$ | 4–13 |
| Extended QoS parameters | 6.4.5.25 | O$^{(10)}$ | 4–25 |
| Generic identifier transport | 6.4.5.31 | O$^{(1,9)}$ | 4–33 |
| Minimum acceptable ATM traffic descriptor | 6.4.5.26 | O$^{(12)}$ | 4–20 |
| Notification indicator | 6.4.5.27 | O$^{(1)}$ | 4-* |
| QoS parameter | 6.4.5.28 | O$^{(1)}$ | 4–6 |
| Transit network selection | 6.4.5.30 | O$^{(1)}$ | 4–9 |

Note 1—This Information Element is included if the received setup indication contains this information.

Note 2—The denoted minimum length depends on the numbering plan employed. The maximum length is 25 octets.

Note 3—This Information Element may be included in case of soft PVPC or PVCC setup, when the calling endpoint wants to inform the destination network interface of the values used for the PVPC or PVCC segment at the calling end.

Note 4—This Information Element is included in case of soft PVPC or PVCC setup.

Note 5—This Information Element is included when preceding side wants to indicate a specific virtual path or virtual channel. If not included, its absence is interpreted as signifying the virtual path or virtual channel is acceptable. This Information Element may only be absent when using the non-associated signalling procedures.

Note 6—When the Broadband repeat indicator Information Element immediately precedes the DTL Information Element, it indicates the order of designated transit list Information Elements in the DTL stack. This Information Element is mandatory, even when there is only one designated transit list Information Element. When the Broadband repeat indicator Information Element immediately precedes any other Information Element, it is included if the received setup indication contains this information.

Note 7—This Information Element is included by the source node to indicate the hierarchical source route for the call. Included by the node at the entry to a hierarchical level to indicate the path through that hierarchical level. This Information Element may be repeated up to 10 times.

Note 8—This Information Element is included to specify an end-to-end transit delay requirement.

Note 9—This Information Element may be present up to three times.

Note 10—This Information Element is included to specify individual QoS parameter requirements for the call.

Note 11—This Information Element is mandatory if the calling user requested an ABR traffic category connection.

Note 12—This Information Element is only present when transit network selection information is present in the received setup indication.

It will be noted from the above table and notes that the Called Party number and Called Party Soft PVPC or PVCC Information Elements are mandatory Information Elements for signalling the setup of a Soft PVPC or PVCC. (The acronyms PVPC and PVCC stand for "Permanent Virtual Path Connection" and "Permanent Virtual Channel Connection" respectively. Both of these terms are subsumed by the term "Permanent Virtual Connection" or PVC which is used herein.) Only the contents of the Called Party Soft PVC Information Element used in a PNNI Soft PVC setup message will be discussed here in detail. Those skilled in the art will be familiar with the details of the other information elements of the such signalling messages. Details of those information elements and PNNI signalling procedures are provided in the PNNI specification and the references cited therein.

An example Called Party Soft PVC information element is reproduced immediately below:

| 8 | 7 | 6 | 5 | 4 | 3 | 2 | 1 | Octet |
|---|---|---|---|---|---|---|---|---|
| 1 | 1 | 1 | 0 | 0 | 0 | 0 | 0 | 1 |
| Called Party Soft PVPC or PVCC Information Element Identifier ||||||||  |
| 1 ext | Coding Standard || IE Instruction Field |||||  2 |
| Length of called party soft PVPC or PVCC contents |||||||| 3 |
| Length of called party soft PVPC or PVCC contents (continued) |||||||| 4 |
| Selection type |||||||| 5 |
| 1 | 0 | 0 | 0 | 0 | 0 | 0 | 0 | 6*$^{(1)}$ |
| VPI identifier ||||||||  |
| VPI value |||||||| 6.1* |
|  |  |  |  |  |  |  |  | 6.2* |
| VCI value ||||||||  |
| 1 | 0 | 0 | 0 | 0 | 0 | 1 | 0 | 7*$^{(1)(2)}$ |
| VCI identifier ||||||||  |
| VCI value |||||||| 7.1* |
|  |  |  |  |  |  |  |  | 7.2* |

Note 1—This octet group is not included when the selection type indicates "any value". If present, it shall be ignored.

Note 2—This octet group is only present in case of a soft PVCC.

Two octets, octets 6.1 and 6.2, contain the VPI value corresponding to the endpoint channel at the called party end of the S-PVC. Similarly, two octets, octets 7.1 and 7.2, contain the VCI value corresponding to the endpoint channel of the S-PVC. When a network SETUP message is constructed by the ingress ATM node 434 requesting an S-PVC between the source and destination communication links 432, 433, the Called Party S-PVC Information Element will include the VPI/VCI values corresponding to the channel on the communication interface 433 that is to be used for the connection. As described above, this VPI/VCI value is provided to the ingress ATM node 434 in the Called Party Information Element of the proxy SETUP message constructed by the call processor 424.

The UNI 3.1 or IISP protocol at the ingress ATM node 434 is modified according to the invention to recognize the encoding of the channel identifiers (i.e. the VPI/VCI values) in the Connection Identifier and Called Party Number Information Elements of the proxy SETUP message. As a result, the information provided in the proxy SETUP message may be used to construct a network SETUP message for requesting the establishment of a S-PVC in the ATM network 412. The network SETUP message will include the mandatory Called Party Number Information Element and the Called Party Soft PVC Information Element. The Called Party Information Element will contain the ATM address of the egress ATM node 438 as provided in octets 6–25 of the Called Party Number Information Element of the proxy SETUP message. The Called Party Soft PVC Information Element contains the VPI/VCI numbers for the channel on the second communications interface 433 as provided in the last four octets of the Called Party Number Information Element in the proxy SETUP message.

As discussed above, the network SETUP message will also include, among other Information Elements, a Designated Transit List (DTL) to indicate the source route for the call in the ATM network 412. Prior to transmission of the network SETUP message, the ingress ATM node 434 makes a cross-connect between the S-PVC and the channel on the communications interface 432 which was identified by the VPI/VCI values in the Connection Identifier Information Element in the proxy SETUP message. The network SETUP message is sequentially processed by each node specified in the DTL to establish the S-PVC according to methods which are known to those skilled in the art. After the SETUP message has propagated through the ATM network 412 to the egress ATM node 438, the egress ATM node 438 establishes a cross-connect to the endpoint channel specified in the S-PVC Called Party Information Element and thereafter sends a CONNECT message back to the ingress ATM node. After the network CONNECT message is received at the ingress ATM node 434, the ingress ATM node 434 sends a CONNECT message to the call processor 424 over the UNI signalling link 427. The call processor 424 can then signal to the SS7 signalling network 418 that a point to point connection has been established. The SS7 signalling network may then complete the end to end call between the source and destination telephones 420, 422 through SS7 signalling.

It was mentioned above that the encoding of connection endpoints in the proxy signalling SETUP message provides a fixed number of bytes for identifying such endpoints. An alternative approach is to utilize the PNNI IEs that are used for SPVCs. The two IEs of interest are once again the "Called Party Soft PVPC or PVCC" IE, and the "Calling Party Soft PVPC or PVCC" IE. Currently these IEs carry a 16-bit VPI field and a 16-bit VCI field. While these IEs are currently specifically for ATM endpoints (VPI and VCI), they can be extended to handle other technologies, i.e. for Frame Relay, the VCI field could be used to carry a DLCI value, or for circuit emulation, the VCI field could carry a timeslot (DS0) number. By provisioning each port with a unique SVC address, and by using the above two SPVC IEs as well as the calling party number E and the called party number IE, a different method can be used to fully specify the source endpoint and the destination endpoint. For the source endpoint, the network management interface can put the address of the source port in the Calling Party Number IE, and put the channel identification (e.g. VPI/VCI for ATM) in the Calling Party Soft PVPC or PVCC IE. The source network node can examine these two IEs and fully determine the source shelf/slot/port from the calling party number, and the channel from the other IE. Similarly, the Called Party Number IE would contain the address of the destination port, and the Called Party SPVC IE would contain the channel info (e.g. VPI/VCI) for the destination endpoint.

There are other possible variations. For example, if the only concern is Cell Relay interfaces, then the source endpoint can be determined completely by the Calling Party SPVC IE if the overall number of interfaces to be controlled is small enough. The VPI field could be used like a VPCI value and would be looked up in a table to determine the source shelf/slot/port/VPI value. The VCI field contains the VCI to use on the VPI which has been looked up. Similarly the Called Party SPVC IE could again use the VPI like a VPCI value to look up the destination shelf/slot/port/VPI, and then the IE would also have the VCI to use. Note that for a VP-level connection, the VCI field is ignored. Then, the called party number would simply have to identify the destination node. In this way, each port on each node would not have to have unique addresses, and instead each node would simply need an address. This approach can also be adapted to other technologies. For example, for Circuit Emulation, the VPI value maps to a shelf/slot/port using a similar look-up table, and the VCI field contains the DS0 number. Or, for Frame Relay, the VPI again maps to shelf/slot/port through a look-up table, and the VCI field contains the DLCI number.

Figure 4:
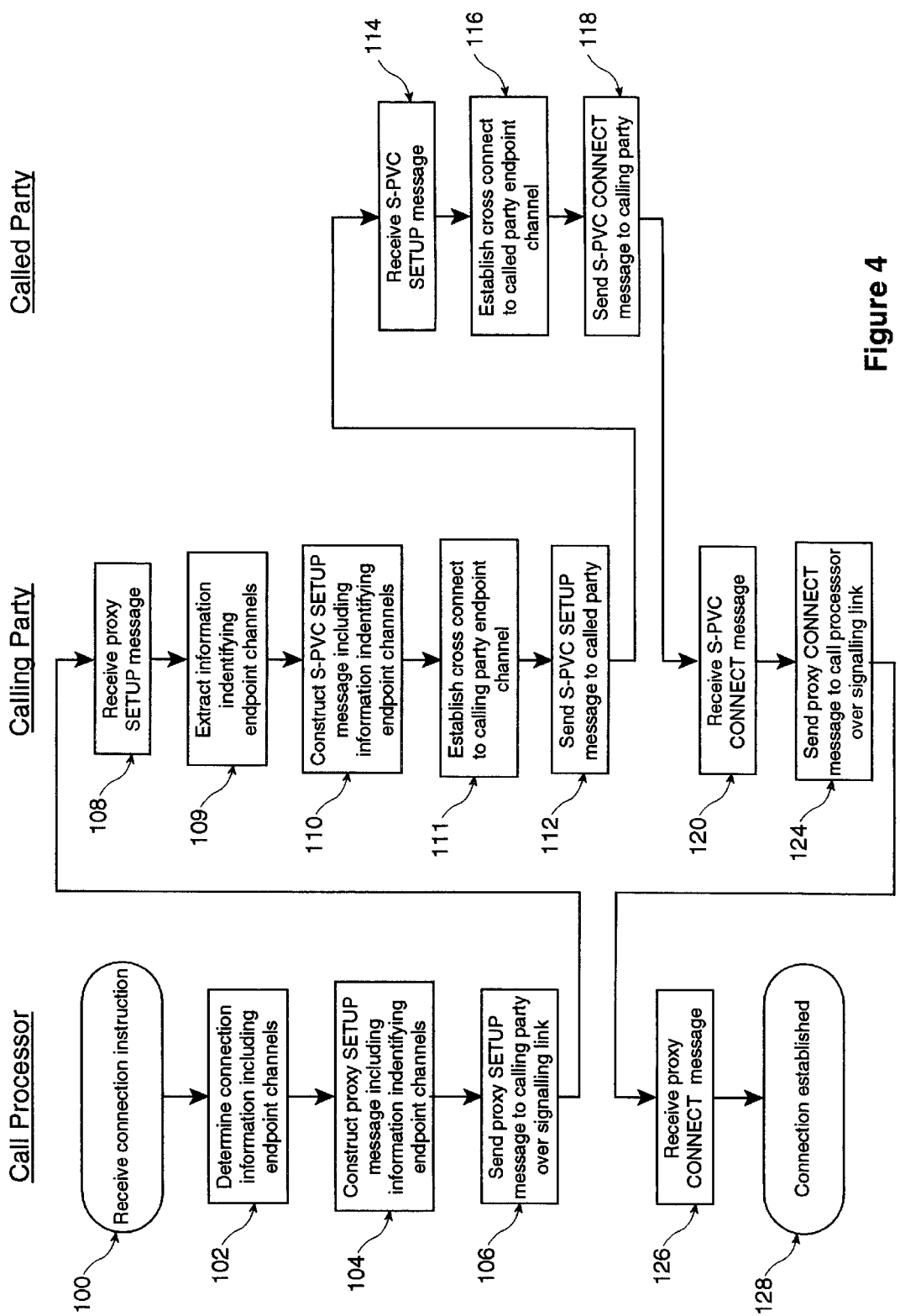
FIG. 4 is a flowchart denoting the steps of a method for signalling a connection across an ATM network according to the first embodiment of the present invention.

The method for establishing connections across an ATM network according to the preferred embodiment of the invention will now be described with reference to FIG. 4. The flowchart in FIG. 4 has three columns. The left-hand column is headed "Call Processor" and includes those procedures of the method performed by a call processor such as the call processor 424 of FIG. 3. The middle column is headed "Calling Party" and includes those procedures in the method performed by a calling party such as the ingress ATM node 434 in FIG. 3. The right-hand column is headed "Called Party" and includes those procedures in the method performed by the called party such as the egress ATM node 438 in FIG. 3. The order of procedures in the method of FIG. 4 is indicated by arrows connecting the procedures.

The method for establishing the connection begins at block 100 when the call processor 424 receives a connection instruction. The connection instruction may be received from a third party application such as the SS7 signalling network 418 of FIG. 3 or another application requiring a connection. Connection information is determined at block 102. This step may involve looking up the connection information such as the VPI/VCI values of the endpoint channels and the calling party and called party numbers. Using the connection information, a proxy SETUP message is constructed at block 104 by the call processor 424 according to an implementation of the method of this invention. The proxy SETUP message includes a Connection Identifier Information Element containing the VPI/VCI value of the endpoint channel for the calling party end of the connection. The proxy SETUP message also includes a Called Party Number Information Element containing both the ATM address of the called party and the VPI/VCI value of the endpoint channel for called party end of the connection. Other information elements are also included in the proxy SETUP message and will be known to those skilled in this art. The proxy SETUP message is then sent at block 106 to the calling party over the proxy signalling link provided between the call processor and the calling party, for example the signalling link 427 of FIG. 3.

The calling party receives the proxy SETUP message at block 108 and extracts the endpoint channel information from the proxy SETUP message at block 109. The endpoint channel information is extracted from the Connection Identifier Information Element and the Called Party Number information element of the proxy SETUP message. The calling party then constructs a S-PVC SETUP message at block 110 based on the contents of the proxy SETUP message. The S-PVC SETUP message includes a Called Party Soft PVC Information Element containing the VPI/VCI value of the endpoint channel to be used at the called party end of the connection. The S-PVC SETUP message includes a Called Party Number Information Element containing the ATM address of the called party. The S-PVC SETUP message also includes a DTL information element specifying the path for the connection through the ATM network. The contents of the DTL are typically determined at the node acting as the calling party as is known to those skilled in the art. The S-PVC SETUP procedure itself is well known to those skilled in this art as are the contents of a S-PVC SETUP message. At block 111, the Calling Party establishes a cross-connect to the endpoint channel that was identified in the Connection Identifier IE of the proxy SETUP message. The S-PVC SETUP message is then sent at block 112 through the ATM network to the called party. The S-PVC SETUP message reaches the called party by way of the intermediate nodes along the path as determined by source routing (for PNNI).

The called party receives the S-PVC SETUP message at block 114 after it has been routed through the nodes identified in the DTL. At block 116 the called party then establishes a cross-connect to the endpoint channel identified in the Called Party Soft PVC Information Element of the S-PVC SETUP message. The cross-connect connects the endpoint channel to the ATM network portion of the connection. The called party then sends an S-PVC CONNECT message to the calling party at block 118. The S-PVC CONNECT message is sent along the path established by the S-PVC SETUP message back to the calling party. The signalling of a S-PVC CONNECT message is known to those skilled in this art.

The calling party receives the S-PVC CONNECT message at block 120 after it has passed through the nodes in the path established by the S-PVC SETUP message. The calling party then sends a CONNECT message to the call processor over the proxy signalling link at block 124. When the call processor receives the CONNECT message at block 126, the call processor indicates that the connection has been established at block 128. The call processor may indicate that the connection has been established by signalling to the application that it may begin using the connection. Where the application is an SS7 signalling network this may be indicated by signalling over a SS7 signalling link such as the SS7 signalling link 427 of FIG. 4.

The method of the invention allows for the establishment of call connections across the ATM network 412 dynamically. According to a preferred embodiment, the modified UNI signalling link 427 provided between the call processor 424 and the ATM network 412 has a virtual bandwidth of approximately 78 kilobits per second on an OC3 link where the traffic descriptor of the signalling link 427 is as follows:

non-real-time Variable Bit Rate (nrt VBR) service category
  peak rate (0+1) of line rate
  sustained rate (0+1) of 75 kilobits per second
  mean burst size (0+1) of 16 cells.

Increased call rates may be achieved by increasing the sustained rate virtual bandwidth of the UNI signalling link 427. If additional signalling links are provided between the call processor 424 and the ingress ATM node 434 the call set up rate may be increased further. The call set up rate is subject to the limitations of the SS7 signalling network 418 (or other preceding network), the number of nodes in the call setup path in the ATM network 412 and the speed of the signalling links 442, 444, 446, 448 provided between those nodes.

Figure 5:
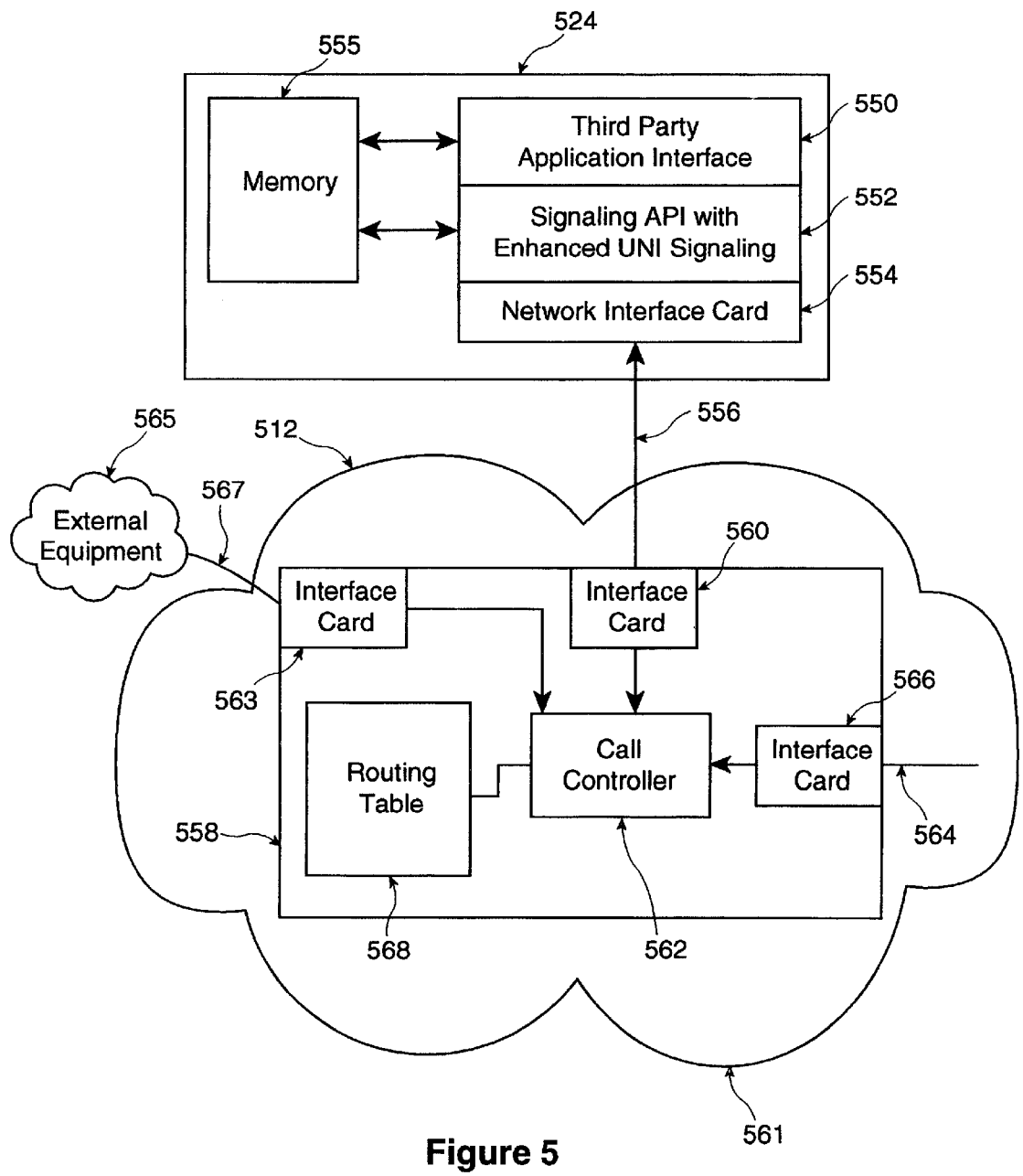
FIG. 5 is a schematic representation of a call processor according to a second embodiment of the present invention.

The invention disclosed herein is not limited to providing signalling links between SS7 signalling networks and ATM networks, but may be used generally for the signalling of connections in a connection oriented backbone network where at least one of the source and destination bridging nodes is not connected to the backbone with a signalling link. FIG. 5 shows a generic call processor 524 for providing the signalling of connections across an ATM network 512. The generic call processor 524 is similar to the call processor 424 of FIG. 3, except that the generic call processor 524 is not necessarily a call processor for an SS7 signalling network.

The call processor 524 includes a third-party application interface 550, an application programming interface (API) 552 and a network interface card (NIC) 554. The third party application interface 550 provides the interface between the call processor 524 and the application for which the call processor 524 is establishing connections in the ATM network 512. For example, the application may be the SS7 signalling network 418 of the communications system 410 of FIG. 3, or it may be a software application which enables a human operator to provide connection instructions to the call processor 524 via a keyboard or graphical user interface (GUI). In any event, the third party application interface 550 provides an interface through which instructions are provided to the call processor 524 for the establishment of connections within the ATM network 512 (block 100 of FIG. 4).

The third party application interface 550 receives or initiates connection instructions and provides the connection setup instructions to the API 552. The API 552 may be implemented in software, such as in C/C++ program code. Either the API 552 or the third party application interface 550 performs a lookup function in memory tables 555 of the call processor 524 to determine which nodes in the connection oriented network and which endpoint channels will provide the intended connection (block 102 of FIG. 4). This involves identifying the calling party and the called party in the ATM network 512 and the endpoint channels connected to the calling party and called party respectively. The API 552 performs the function of converting the information provided by the third party application interface 550 into a proxy setup message (block 104 of FIG. 4) which is sent by the network interface card 554 over a proxy signalling link 556 (block 106 of FIG. 4) to a network element 558 in the connection oriented network 512. The network element 558 is the calling party for the intermediate connection. The proxy setup message produced by the API 552 is modified according to the method of the invention in that it contains the additional information identifying the endpoint channels of the desired connection. The network interface card 554 may be any commercially available interface card as will be familiar to those skilled in the art.

Together, the API 552 and the network interface card 554 serve as a signalling interface between the third party application and the signalling link. The preferred API 552 converts the instructions received from the third party application interface into a proxy setup message according to the UNI 3.1 signalling protocol as defined in the UNI 3.1 specification with the modifications as described above. It will be apparent to those skilled in the art that the API 552 of the call processor 524 may alternatively produce setup messages according to the UNI 4.0 signalling protocol as defined in the UNI 4.0 specification, or to ITU-T Q.2931 or any other similar signalling protocol, with equivalent enhancements. Where the proxy signalling link is based on modifications to the UNI 4.0 protocol, the call processor 524 may act as the user side and the source node as the network side, since for UNI 4.0 the user side of the protocol is permitted to include the Connection Identifier IE in a Call SETUP message. The proxy SETUP message is sent over the signalling link 556 to the network element 558. The network element 558 may be a MainStreet Xpress (TM) 36170 network switch which has been adapted to execute the methods of the invention. Other existing ATM switches may also be adapted for use with the present invention.

In the preferred embodiment source routing is performed by the network element 558. Thus, it is not necessary for the call processor 524 to store all information about the topology and connectivity of the ATM network 512. The call processor 524 also does not have to calculate paths for connections through the ATM network 512. Aside from the endpoint information, the calculation of the path through the ATM network 512 is performed by the network element 558 which is the calling party for the connection. The call processor 524 needs to know the ATM addresses of the possible called party nodes in the ATM network 512 and the channel identifications for the channels on communications interfaces connecting other equipment to the ATM network 512. However, this information relates only to the periphery of the ATM network 512. As a result, the memory storage capabilities and the computational complexity required of the call processor 524 may be less significant than it would be according to some of the methods of the prior art described above.

Signalling messages are received by the network element 558 over the signalling link 556 at a first interface card 560 or the like which passes signalling messages to a call controller 562. The call controller 562 administers the Connection Admission Control (CAC) for the network element 558. The network element 558 may communicate with other nodes that are internal of the network 561 of which it forms a part over a second signalling link 564 through a second interface card 566 or the like. The first interface card 560 serves as a signalling interface between the call controller 562 and the signalling link 556. The second interface card 566 serves as a signalling interface between the call controller 562 and the signalling link 564. Other interface cards may also be provided for other signalling or communications links. For instance, interface card 563 provides a interface for communications link 567 between the network element 558 and external equipment 565, in this case an originating network. The interface cards may also be used for communicating data over connections which pass through the network element 558. The call controller 562 controls and processes the signalling messages communicated over the signalling links 556, 564. The second signalling link 564 is associated with the signalling protocol of the ATM network 512. The signalling protocol of the ATM network 512 provides Information Elements in the SETUP message to identify the endpoint channels of the connection.

The function of the network element 558 will now be described by reference to the steps set out in FIG. 4. The network element 558 (the calling party) receives the proxy SETUP message provided over the signalling link 556 (block 108 of FIG. 4) and passes the proxy SETUP message to the call controller 562. The call controller 562 extracts the additional information identifying the endpoint channels of the desired connection from the proxy SETUP message (block 109 of FIG. 4). Preferably, the call controller 562 automatically extracts the endpoint channel information from the proxy SETUP message whenever a proxy SETUP message is received over signalling link 556. That is, the call controller 562 is configured to extract the endpoint information from every proxy SETUP message received over signalling link 556. Alternatively, the call controller 562 may be provided with additional functionality which would enable it to check the proxy SETUP message received over the signalling link 556 for a flag or code indicating to the call controller 582 that information identifying endpoint channels has been included in a received proxy SETUP message, and where this is detected, then extract the endpoint channel information.

The proxy SETUP message also includes information identifying the calling party and called party for the desired connection. With the endpoint channel information and the calling party and called party information, the call controller constructs an S-PVC SETUP message (block 110 of FIG. 4). The called party information and the information identifying the endpoint channel connected to the calling party are included by the call controller 562 in the S-PVC SETUP message in the Called Party Number Information Element and Called Party S-PVC Information Element respectively. The call controller 562 establishes a cross-connect in the network element 558 to connect the calling party endpoint channel to the path established between the network element 558 and the called party endpoint channel (block 111 of FIG. 4). The cross-connect between the calling party endpoint channel and the path established by the S-PVC SETUP message is created by the call controller 562 in a routing table 568 in the network element 558. The call controller 562 then sends the S-PVC SETUP message towards the called party over the second signalling link 564 through the second NIC 566 (block 112 of FIG. 4). Once the S-PVC SETUP message is constructed and sent by the call controller 562, the establishment of the intermediate path between the called party and the network element 558 including the establishment of a cross-connect to the called party endpoint channel are performed according to the signalling procedures employed in the ATM network 512 (blocks 114–118 of FIG. 4).

When the network element 558 receives a S-PVC CONNECT message indicating that a portion of the connection has been established between the network element 558 and the called party endpoint channel. The routing table 568 is preferably implemented in a memory device in the network element 558. The operation of cross-connects and routing tables is known to those skilled in this art. The call controller 562 then sends a CONNECT message over the signalling link 556 to the call processor 524 (block 124 of FIG. 4). When the call processor 524 receives the CONNECT message (block 126 of FIG. 4), it may indicate to the third party application that the connection it requested inn block 100 has been established (block 128 of FIG. 4) and that communications over the connection may be commenced.

Thus, according to the invention, the management interface or call processor still requests paths over a proxy-like interface using signalling methods at the source node, as is the case with certain prior art methods. However, the proxy SETUP message is augmented to allow for a full specification of the source endpoint and the destination endpoint. Then, upon receiving the proxy SETUP message within the intermediate network being traversed, the call is signalled across the network like an S-PVC is. Thus, the destination node will be told which port and channel to use at the destination, and will automatically answer the call by signalling back a CONNECT message by means of the signalling infrastructure of the intermediate network. Since no management communication is wanted at the destination node, the destination node is not told which S-PVCs to expect on a path by path basis. Thus, the management interface need only communicate with the source node over an efficient signalling interface. When the CONNECT message reaches the source node, it is communicated back over the proxy interface, and thus the management interface is informed that the path is successfully connected. To remove the path, the management interface sends a RELEASE message over the modified proxy signalling interface, and the call and cross-connects are cleared across the network.

In this manner, the management interface only needs to have signalling communications with the source network node of each path, and can specify both endpoints at once. There is no issue of correlating a SETUP sent with a SETUP received, thus simplifying the logic in the management interface over the known third category of methods of the prior art. As well, it can be expected that less resources such as processor resources and RAM resources will be utilized by the methods and apparatus of the invention, when compared to the third category of known methods described above. And, unlike the second category of prior art methods, a signalling interface is used which is designed for high call rates, versus a normally much slower and cumbersome management interface into the node.

Those skilled in the art will appreciate that the invention has been described herein by way of example only and that various modifications of detail may be made to the invention, all of which come within its spirit and scope. For instance, while the invention was described in relation to illustrative embodiments having point-to-point connection topologies, those skilled in this art will understand that the principles of the invention may be applied to other connection topologies, such as point-to-multipoint and multipoint-to-multipoint.

What is claimed is:

1. A method for establishing a connection across a connection oriented network on behalf of an originating network element to enable communications between the originating network element and a destination network node, the destination network node being addressable in the connection oriented network, the originating network element being connected to a source network node in the connection oriented network by a source communications channel addressable in the connection oriented network, the connection oriented network having a signalling infrastructure employing a network signalling protocol for establishing connections within the connection oriented network, the method comprising the steps of:

(a) generating a proxy connection establishment request message for requesting the establishment of the connection between the originating network element and the destination network node, the proxy connection establishment request message comprising information identifying the source communications channel;

(b) sending the generated proxy connection establishment request message from a network controlling element to the connection oriented network over a proxy signalling link provided between the network controlling element and the signalling infrastructure of the connection oriented network;

(c) receiving the proxy connection establishment request message at the connection oriented network over the signalling link;

(d) extracting the information identifying the source communications channel from the proxy connection establishment request message so received and establishing a cross-connect at the source network node to the source communications channel identified in the proxy connection establishment request message;

(e) generating a network connection establishment request message based on information contained in said proxy connection establishment message according to the network signalling protocol;

(f) sending the generated network connection establishment message over the signalling infrastructure to establish a path between the source network node and the destination network node using automated signalling procedures according to the network signalling protocol;

(g) sending a network acknowledgement message which confirms establishment of said path, said network acknowledgement message being sent according to the network signalling protocol from the destination network node to the source network node over said signalling infrastructure;

(h) after said path is established, sending a proxy acknowledgement message which confirms establishment of said connection between the originating network entity and the destination node, said proxy acknowledgement message being sent to the network controlling element from the source network node.

2. The method of claim 1 wherein the originating network element is external to the connection oriented network.

3. The method of claim 2 wherein the proxy acknowledgement message is sent over the proxy signalling link.

4. The method of claim 3 wherein the destination network node is connected to a terminating network element by a destination communications channel addressable in the connection oriented network, the proxy connection establishment request message further comprising information identifying the destination communications channel and the destination network node, the method further comprising the steps of:

extracting the information identifying the destination communications channel from the proxy connection establishment request message;

at the destination network node, connecting the path to the destination communications channel identified in the proxy connection establishment request message after the path is established to thereby establish a connection between the source network node and the terminating network element; and wherein the network connection establishment request message includes information identifying the destination communications channel and the destination network node, and wherein the proxy acknowledgement message is sent after the connection between the originating network element and the destination network node and after the connection between the destination network node and the terminating network element have both been established.

5. The method of claim 4 wherein the terminating network element is external to the connection oriented network.

6. The method of claim 5 wherein the source network node is connected to the proxy signalling link, and wherein the steps of receiving the proxy connection establishment request message, of extracting information from the proxy connection establishment request message, and of generating and sending a network connection establishment request message, are all performed at the source network node.

7. The method of claim 6 wherein at least one intermediate network element is provided in the path between the source network node and the destination network node, wherein the path between the source network node and the destination network node is established by successively establishing a cross-connect in each intermediate network element provided in the path.

8. The method of claim 7 further comprising the step of determining at the source network node a route for the path between the source network node and the destination network node and wherein the network connection establishment request message further comprises information identifying each intermediate network element in the route.

9. The method of claim 8 wherein the proxy connection establishment request message comprises information elements which correspond to information elements of a SETUP message according to a UNI signalling protocol, wherein a first information element of the proxy connection establishment request message comprises the information identifying the source communications channel and a second information element of the proxy connection establishment request message comprises the information identifying the destination network node and the information identifying the destination communications channel.

10. The method of claim 9, wherein the UNI signalling protocol is selected from the group comprising UNI 3.1 signalling, UNI 4.0 signalling and ITU-T Q.2931 signalling.

11. The method of claim 10, wherein the first information element is the Connection Identifier information element and the second information element is the Called Party Number information element.

12. The method of claim 8 wherein the information identifying the source communications channel comprises a virtual path identifier (VPI) of the first communications channel and the information identifying the destination communications channel comprises a VPI of the destination communications channel.

13. The method of claim 12 wherein the network signalling protocol employed is a PNNI signalling protocol, the network connection establishment request message is a Soft-Permanent Virtual Path Connection (S-PVPC) SETUP message, the S-PVPC SETUP message comprising a called party S-PVPC information element, and wherein the called party S-PVPC information element comprises information identifying the destination communications channel.

14. The method of claim 12 wherein the information identifying the source communications channel further comprises the virtual channel identifier (VCI) of the first communications channel and the information identifying the destination communications channel further comprises the VCI of the destination communications channel.

15. The method of claim 14 wherein the network signalling protocol employed is a PNNI signalling protocol, the network connection establishment request message is a Soft-Permanent Virtual Channel Connection (S-PVCC) setup message, the S-PVCC setup message comprises a called party S-PVCC information element, and wherein the called party S-PVCC information element comprises information identifying the destination communications channel.

16. A network controlling element for signalling a connection across a connection oriented network on behalf of an originating network element to enable communications between the originating network element and a destination network node, the destination network node being addressable in the connection oriented network, the originating network element being connected to a source network node in the connection oriented network by a source communications channel addressable in the connection oriented network, the connection oriented network having a signalling infrastructure employing a network signalling protocol for establishing connections within the connection oriented network, a proxy signalling link being provided between the network controlling element and the signalling infrastructure of the connection oriented network, the network controlling element comprising:

(a) a communications interface for receiving instructions for establishing the connection on behalf of the originating network element;

(b) a proxy signalling interface for generating a proxy connection establishment request message, for transmitting the proxy connection establishment request message over the proxy signalling link to the signalling infrastructure of the connection oriented network, and for receiving a proxy connection acknowledgement message from the source network node which is indicative of the establishment of the connection; and wherein the proxy connection establishment request message comprises information identifying the source communications channel, the information identifying the source communications channel being extracted from the proxy connection establishment request message when same is received at the connection oriented network over the proxy signalling link, wherein a cross-connect is established at the source network node to the source communications channel identified in the proxy connection establishment request message and wherein a network connection establishment request message is generated according to the network signalling protocol based on information contained in said proxy request message and is sent over the signalling infrastructure to establish a path between the source network node and the destination network node using automated signalling procedures according to the network signalling protocol, whereupon the proxy connection acknowledgement message is sent to the network controlling element from the source network node.

17. The network controlling element of claim 16, wherein the originating network element is external to the connection oriented network.

18. The network controlling element of claim 17, wherein the proxy connection acknowledgement message is sent over the proxy signalling link.

19. The network controlling element of claim 18 wherein the destination network node is connected to a terminating network element by a destination communications channel addressable in the connection oriented network, the proxy connection establishment request message further comprising information identifying the destination communications channel and the destination network node, and wherein the information identifying the destination communications channel is extracted from the proxy connection establishment request message, the network connection establishment request message including the information identifying the destination communications channel and the destination network node and, after the path is established, the path is connected at the destination network node to the destination communications channel identified in the proxy connection establishment request message thereby establishing a connection between the source network node and the terminating network element, the proxy connection acknowledgement message being sent after the connection between the originating network element and the destination network node and after the connection between the destination network node and the terminating network element have both been established.

20. The network controlling element of claim 19, wherein the terminating network element is external to the connection oriented network.

21. The network controlling element of claim 20 wherein the connection oriented network is an Asynchronous Transfer Mode (ATM) network.

22. The network controlling element of claim 21 wherein the proxy connection establishment request message comprises information elements which correspond to information elements of a SETUP message according to the UNI 3.1 signalling protocol, wherein a first information element of the proxy connection establishment request message comprises the information identifying the source communications channel and a second information element of the proxy connection establishment request message comprises the information identifying the destination network node and the information identifying the destination communications channel.

23. The network controlling element of claim 22 wherein the first information element is the Connection Identifier information element and the second information element is the Called Party Number information element.

24. The network controlling element of claim 23 wherein the information identifying the source communications channel comprises a virtual path identifier (VPI) of the source communications channel and the information identifying the destination communications channel comprises a VPI of the destination communications channel.

25. The network controlling element of claim 24 wherein the network signalling protocol employed in the signalling infrastructure is the PNNI signalling protocol, the network connection establishment request message is a Soft-Permanent Virtual Path Connection (S-PVPC) SETUP message, the S-PVPC SETUP message comprising a Called Party S-PVPC information element, and wherein the Called Party S-PVPC information element comprises information identifying the destination communications channel.

26. The network controlling element of claim 24 wherein the information identifying the source communications channel further comprises a virtual channel identifier (VCI) of the source communications channel and the information identifying the destination communications channel further comprises a VCI of the destination communications channel.

27. The network controlling element of claim 26 wherein the network signalling protocol employed in the signalling infrastructure is the PNNI signalling protocol, the network connection establishment request message is a Soft-Permanent Virtual Channel Connection (S-PVCC) SETUP message, the S-PVCC SETUP message comprising a Called Party S-PVCC information element, and wherein the Called Party S-PVCC information element comprises information identifying the destination communications channel.

28. The network controlling element of claim 27 wherein the proxy signalling interface further comprises: an application programming interface for constructing the proxy connection establishment request message according to the instructions received at the communications interface; and a network interface card for sending the proxy connection establishment request message over the proxy signalling link to the connection oriented network.

29. The network controlling element of claim 28 further comprising a memory accessible by the proxy signalling interface, the memory storing information associating the source communications channel with the source network node and the destination communications channel with the destination network node.

30. An apparatus associated with a source network node for establishing a connection across a connection oriented network between an originating network element and a destination network node via the source network node, the source network node and the destination network node being addressable in the connection oriented network the originating network element being connected to the source network node by a source communications channel addressable in the connection oriented network, the connection oriented network having a signalling infrastructure employing a network signalling protocol for establishing connections within the connection oriented network the source communications channel being identified in information included in a proxy signalling message consisting of a proxy connection establishment request message received by the apparatus over a proxy signalling link, the apparatus comprising:

(a) a proxy signalling interface which sends and receives proxy signalling messages over the proxy signalling link;

(b) a network signalling interface which sends and receives network signalling messages over the signalling infrastructure of the connection oriented network;

(c) a call controller which extracts from the proxy connection establishment request message the information identifying the source communications channel, which establishes a cross-connect at the source network node to the source communications channel identified in the proxy connection establishment request message and which generates a network signalling message based on information contained in said proxy connection establishment request message and consisting of a network connection establishment request message according to the network signalling protocol, the call controller providing the network connection establishment request message to the network signalling interface which in turn sends the network connection establishment request message over the signalling infrastructure of the connection oriented network to thereby establish a path between the source network node and the destination network node; and wherein after the path between the source network node and the destination network node has been so established, the apparatus receives a network signalling message consisting of a network connection acknowledgement message from the destination network node over the signalling infrastructure and at the network signalling interface, following which the call controller provides a proxy signalling message consisting of a proxy connection acknowledgement message to the proxy signalling interface.

31. The apparatus of claim 30 wherein the originating network element is external to the connection oriented network.

32. The apparatus of claim 31 wherein the proxy connection acknowledgement request message is sent by the proxy signalling interface over the proxy signalling link.

33. The apparatus of claim 32 wherein the destination network node is connected to a terminating network element by a destination communications channel addressable in the connection oriented network, the proxy connection establishment request message further comprising information identifying the destination communications channel, the source network node and the destination network node, wherein the call controller extracts the information identifying the destination communications channel from the proxy connection establishment request message prior to generating the network connection establishment request message, the call controller including the information identifying the destination communications channel and the destination network node in the network connection establishment request message, wherein after the path is established the path is connected at the destination network node to the destination communications channel identified in the proxy connection establishment request message to thereby establish a connection between the source network node and the terminating network element, and wherein the proxy connection acknowledgement message is sent by the proxy signalling interface after the connection between the originating network element and the destination network node and between the destination network node and the terminating network element have both been established.

34. The apparatus of claim 33, wherein the apparatus is located in the source network node and further comprises a routing table, wherein the call controller establishes a cross-connect to a source communications channel as found in the routing table.

35. The apparatus of claim 34 wherein the connection oriented network is an Asynchronous Transfer Mode (ATM) network.

36. The apparatus of claim 35 wherein the proxy connection establishment request message comprises information elements which correspond to information elements of a SETUP message according to the UNI 3.1 signalling protocol, wherein a first information element of the proxy connection establishment request message comprises the information identifying the source communications channel and a second information element of the proxy connection establishment request message comprises the information identifying the destination network node and the information identifying the destination communications channel.

37. The apparatus of claim 36 wherein the first information element is the Connection Identifier information element and the second information element is the Called Party Number information element.

38. The apparatus of claim 37 wherein the information identifying the source communications channel comprises a virtual path identifier of the source communications channel and the information identifying the destination communications channel comprises a virtual path identifier of the destination communications channel.

39. The apparatus of claim 38 wherein the signalling protocol employed in the signalling infrastructure is a PNNI signalling protocol, the network connection establishment request message is a Soft-Permanent Virtual Path Connection (S-PVPC) setup message, the S-PVPC setup message comprising a Called Party S-PVPC information element, wherein the Called Party S-PVPC information element comprises information identifying the destination communications channel.

40. The apparatus of claim 38 wherein the information identifying the source communications channel further comprises a virtual channel identifier of the source communications channel and the information identifying the destination communications channel further comprises a virtual channel identifier of the destination communications channel.

41. The apparatus of claim 40 wherein the signalling protocol employed in the signalling infrastructure is a PNNI signalling protocol, the network connection establishment request message is a Soft-Permanent Virtual Channel Connection (S-PVCC) setup message, the S-PVCC setup message comprising a Called Party S-PVCC information element, wherein the Called Party S-PVCC information element comprises information identifying the destination communications channel.

* * * * *